(12) United States Patent
Sanders et al.

(10) Patent No.: US 9,570,086 B1
(45) Date of Patent: Feb. 14, 2017

(54) INTELLIGENTLY CANCELING USER INPUT

(71) Applicant: Google Inc., Mountain View, CA (US)

(72) Inventors: Jason Sanders, New York, NY (US); Gabriel Taubman, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/676,283

(22) Filed: Nov. 14, 2012

Related U.S. Application Data

(60) Provisional application No. 61/654,507, filed on Jun. 1, 2012, provisional application No. 61/654,518, filed on Jun. 1, 2012, provisional application No. 61/561,505, filed on Nov. 18, 2011, provisional application No. 61/654,746, filed on Jun. 1, 2012, provisional application No. 61/654,512, filed on Jun. 1, 2012, provisional application No. 61/663,857, filed on Jun. 25, 2012, provisional application No. 61/654,421, filed on Jun. 1, 2012.

(51) Int. Cl.
*G10L 15/22* (2006.01)
*G10L 21/00* (2013.01)

(52) U.S. Cl.
CPC ............ *G10L 21/00* (2013.01); *G10L 15/22* (2013.01); *G10L 2015/221* (2013.01); *G10L 2015/223* (2013.01)

(58) Field of Classification Search
USPC ................................. 704/251, 255, 270, 275
See application file for complete search history.

(56) References Cited

U.S. PATENT DOCUMENTS

| | | | |
|---|---|---|---|
| 5,179,627 A * | 1/1993 | Sweet et al. ................... 704/200 |
| 6,192,343 B1 * | 2/2001 | Morgan et al. ................ 704/275 |
| 6,345,254 B1 | 2/2002 | Lewis et al. |
| 6,505,155 B1 * | 1/2003 | Vanbuskirk et al. .......... 704/246 |
| 7,353,176 B1 * | 4/2008 | Baray ...................... G10L 15/22 704/257 |
| 8,793,236 B2 * | 7/2014 | Smith ................ G06F 17/30867 704/9 |
| 2004/0078201 A1 * | 4/2004 | Porter et al. ................... 704/275 |
| 2006/0106614 A1 * | 5/2006 | Mowatt et al. ................ 704/275 |
| 2006/0111890 A1 * | 5/2006 | Mowatt et al. .................... 704/3 |
| 2006/0187034 A1 * | 8/2006 | Styers et al. ............... 340/545.1 |
| 2006/0215824 A1 * | 9/2006 | Mitby ..................... G10L 15/22 379/100.05 |
| 2008/0077408 A1 * | 3/2008 | Wang et al. .................. 704/275 |
| 2008/0091426 A1 * | 4/2008 | Rempel ................... G10L 15/26 704/251 |
| 2008/0165937 A1 * | 7/2008 | Moore ........................ 379/88.04 |
| 2008/0243504 A1 * | 10/2008 | Poi ......................... G10L 15/063 704/247 |
| 2010/0125460 A1 * | 5/2010 | Mellott et al. ............. 704/270.1 |
| 2010/0179812 A1 | 7/2010 | Jang et al. |

(Continued)

*Primary Examiner* — James Wozniak
(74) *Attorney, Agent, or Firm* — Fish & Richardson P.C.

(57) ABSTRACT

Methods, systems, and apparatus, including computer programs encoded on a computer storage medium, for intelligently cancelling user inputs. In one aspect, a requests input by a user is received by a dialog engine. A prompt or notification regarding the request is output by the dialog engine. That the user has taken an action in response to the prompt or notification is determined by the dialog engine. Based on the action taken by the user, that the response corresponds to a potential cancellation command is determined by the dialog system.

20 Claims, 19 Drawing Sheets

(56) References Cited

U.S. PATENT DOCUMENTS

2010/0289661 A1* 11/2010 Styers et al. ............... 340/686.1
2010/0312547 A1* 12/2010 Van Os et al. .................... 704/9
2011/0184730 A1* 7/2011 LeBeau et al. .............. 704/201
2012/0109652 A1* 5/2012 Levit et al. ................... 704/251

* cited by examiner

500 →

| Potential cancellation terms | Cancellation score |
|---|---|
| Never mind | 1.0 |
| Forget that | 0.8 |
| Actually forget that | 0.8 |
| Cancel | 0.5 |
| Tell me more | 0.1 |
| Yes | 0.0 |
| No | 0.0 |
| ... | ... |

| Device state | Ignore cancellations? | Exceptions apply? |
|---|---|---|
| E-mail dictation | Yes | Yes |
| SMS dictation | Yes | Yes |
| Question clarification | No | N/A |
| Number input | No | N/A |
| Telephone call in progress | Yes | No |
| ... | ... | ... |

| Device state | Potential cancellation terms | Cancellation score |
|---|---|---|
| E-mail dictation | Cancel e-mail | 0.9 |
| E-mail dictation | Computer cancel | 0.6 |
| SMS dictation | Cancel text message | 1.0 |
| SMS dictation | Forget this SMS | 0.7 |
| SMS dictation | Computer cancel | 0.5 |
| ... | ... | ... |

FIG. 7

INTELLIGENTLY CANCELING USER INPUT

CROSS-REFERENCE TO RELATED APPLICATION

This application claims the benefit of U.S. Provisional Pat. App. No. 61/561,505, filed Nov. 18, 2011, U.S. Provisional Pat. App. No. 61/654,746, filed Jun. 1, 2012, U.S. Provisional Pat. App. No. 61/654,512, filed Jun. 1, 2012, U.S. Provisional Pat. App. No. 61/654,507, filed Jun. 1, 2012, U.S. Provisional Pat. App. No. 61/654,518, filed Jun. 1, 2012, U.S. Provisional Pat. App. No. 61/654,421, filed Jun. 1, 2012, and U.S. Provisional Pat. App. No. 61/663,857, filed Jun. 25, 2012, which are incorporated herein by reference.

BACKGROUND

User devices, such as mobile telephones or computers, implement a variety of techniques through which users can find information or perform actions. For example, some user devices implement spoken dialog systems, which may be able to audibly provide answers to questions provided by users or to perform actions based on user commands.

SUMMARY

A user that operates a device that includes a dialog engine, such as a mobile telephone or computer, may speak into the device to request the device to retrieve information or to perform an action. In some instances, the user device may request further clarification or refinement related to the user's initial input. When the request for clarification or refinement is made by the user device, the user can respond by cancelling their initial request. For example, the user may no longer require retrieval of the information or performance of the action, or may instead want to request retrieval of different information or performance of a different action.

According to one aspect of the subject matter described by this specification, spoken terms are evaluated or classified as potential cancellation terms based on actions performed by the user after speaking the terms. Cancellation scores may be assigned to spoken terms based on the extent to which the specific actions performed at the user device following input of the spoken terms are consistent or inconsistent with a cancellation action. For example, an input from a user that explicitly confirms that a spoken input represents a cancellation command may be assigned a cancellation score that reflects that the spoken input is more likely to be a cancellation command. An input from a user that results in an application, such as a browser, being opened by the mobile device may result in a different cancellation score being assigned to the spoken input, reflecting that the spoken input is less likely to be a cancellation command.

To determine if a spoken input should be processed as a cancellation command, the user device determines if the user input to the dialog system contains or matches a term that has been assigned a cancellation score that satisfies a cancellation score threshold. A cancellation score related to a particular potential cancellation term can be changed or reassigned based on future user inputs containing that potential cancellation term and subsequent activity performed at the user device following that user input. In this way, the user device can learn new potential cancellation terms based on user input as well as information relating to user interaction with the device following user input.

According to the innovative aspects of the subject matter described in this specification, a method includes receiving a request input by a user, outputting a prompt or notification regarding the request, receiving a response to the prompt or the notification regarding the request, and processing the response as a potential cancellation command.

Other embodiments of these aspects include corresponding systems, apparatus, and computer programs configured to perform the actions of the methods, encoded on computer storage devices.

These and other implementations can each optionally include one or more of the following features. For instance, the method includes speech data encoding a request spoken by the user; the method includes outputting a prompt that requests the user to confirm that the command is to be cancelled and determining that the user has confirmed that the request is to be cancelled; the method includes outputting a notification indicating that an action will be automatically initiated unless the user provides an additional input, and determining that the user has provided the additional input; the method includes determining that the user has input the request again; the method includes determining that the user has input a different request; the method includes determining powering down, disabling, or locking of a device that includes the dialog engine; the method includes determining that the user has taken an action that is inconsistent with completing the request; the method includes determining that that user has opened and application; and/or the method includes determining that that user has input a term that also corresponds to a potential cancellation command.

By properly processing cancellation inputs, a system, according to one or more implementations described herein, may enhance users' experience by, for example, avoiding situations where cancellation commands are not properly classified. For example, a user may provide the spoken input, "Call Mike" to a mobile device. In response to the spoken input, the user device identifies multiple contacts named Mike, and the system requests clarification as to which Mike the user would like to contact. At this point, the user device may enter a state in which the system can receive input provided by the user, e.g., input providing the requested clarification. The user then provides the input, "Never mind" to the mobile device. The system of some implementations may avoid a situation where the user device responds by outputting the phrase, "I could not find Mike Nevermind in your contact book." The system of some implementations may, instead, classify the input "Never mind" as a cancellation command and abort the dialog operation.

The details of one or more implementations are set forth in the accompanying drawings and the description below. Other potential features and advantages will become apparent from the description, the drawings, and the claims.

BRIEF DESCRIPTION OF THE DRAWINGS

FIGS. 5-7 illustrate example data structures that may be stored by a dialog cancellation detection system according to one or more implementations described herein;

Like reference numbers and designations in the various drawings indicate like elements.

DETAILED DESCRIPTION

A system and/or method, described herein, may enable one or more devices to engage in ongoing dialog with users. As part of the dialog, the one or more devices may enter into a state where the one or more devices is to receive input provided by the user. The one or more devices may enter such a state when, for example, prompting a user for a clarification and/or a refinement of previous user input, receiving voice dictation input, etc. The one or more devices of some implementations may identify inputs as containing cancellation commands from users. For example, the one or more devices of some implementations may receive input from a user and identify the input as containing a cancellation command that causes the one or more devices to exit the state of the one or more devices in which input may be received from the user.

In some implementations, the one or more devices may learn, over time, inputs that are to be processed as cancellation commands. The one or more devices may, for example, identify inputs that are received from users and identify, based on subsequent activity received from the users, that these identified inputs should be processed as cancellation commands. For example, subsequent actions performed at the user device and identified as potential indications of cancellation commands may include any number of: placing a telephone call, accessing email, composing a SMS or MMS message, opening a web browser, executing an application, accessing video or image content, powering off the device, and/or any other inputs, actions, or combinations of inputs and actions performed at the user device.

Figure 1A:
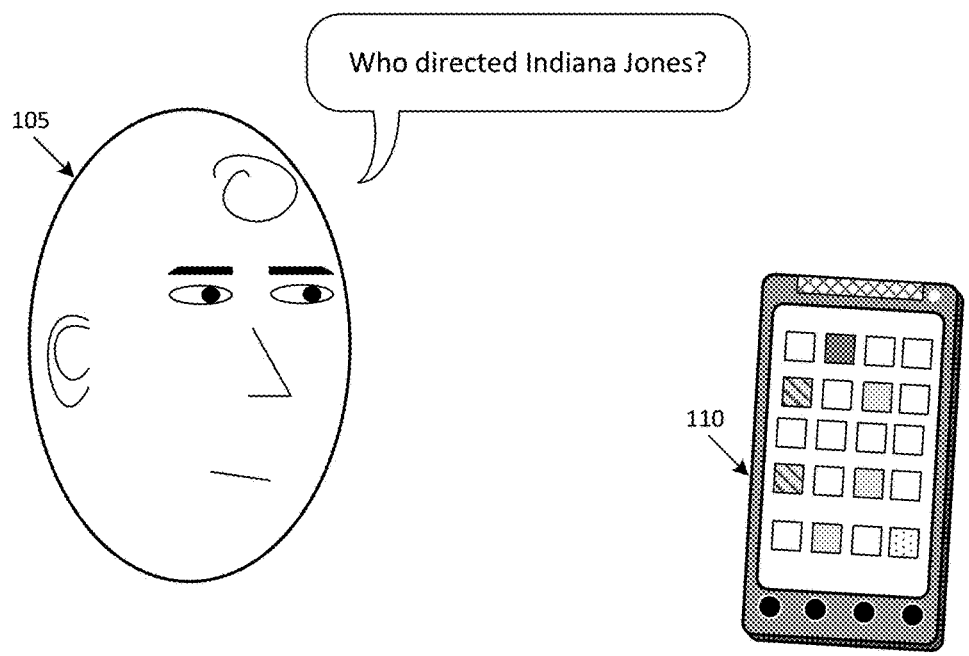
FIGS. 1A-1E illustrate an overview of example implementations described herein.
Figure 1B:
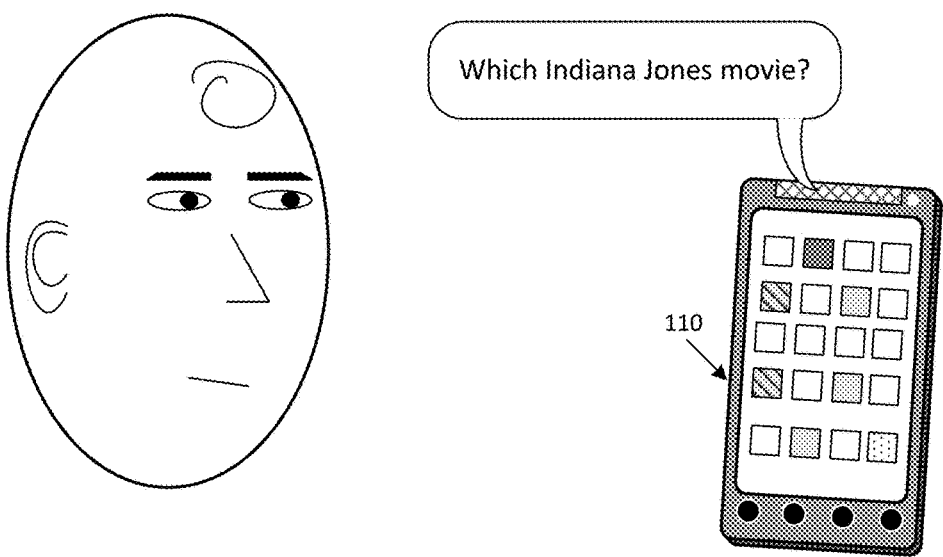

FIGS. 1A-1D illustrate an overview of example implementations described herein. As shown in FIG. 1A, user 105 may ask the question "Who directed Indiana Jones?" to user device 110. As shown in FIG. 1B, user device 110 may provide a clarification question, such as "Which Indiana Jones movie?" When providing this clarification question, user device 110 may enter a state in which input may be received from the user 105 by the user device 110. For example, in this state, user device 110 may use subsequent input from user 105 in conjunction with the question "Who directed Indiana Jones?" in order to answer the question.

Figure 1C:
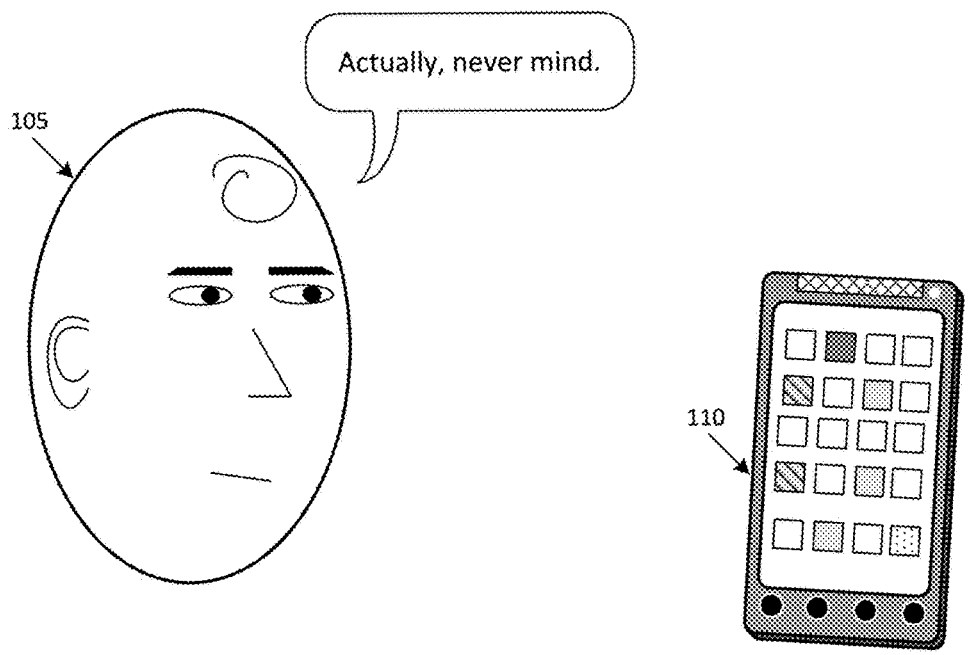
Figure 1D:
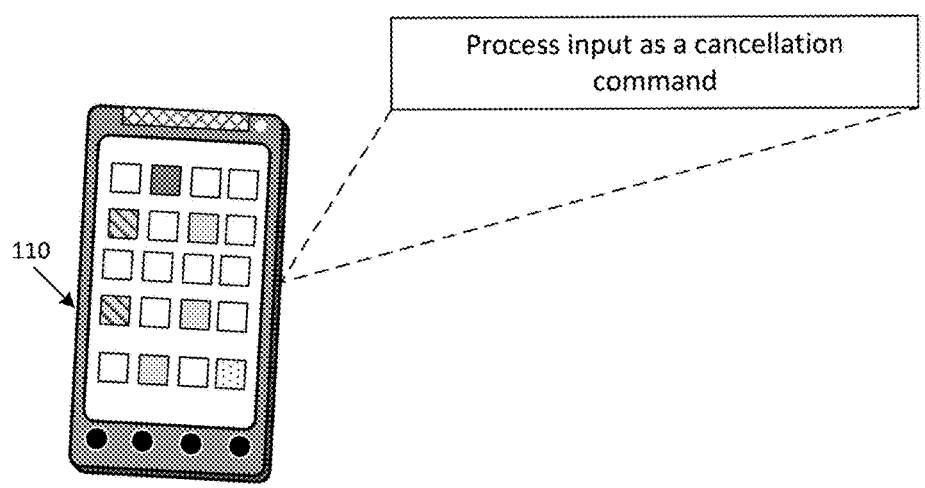
Figure 1E:
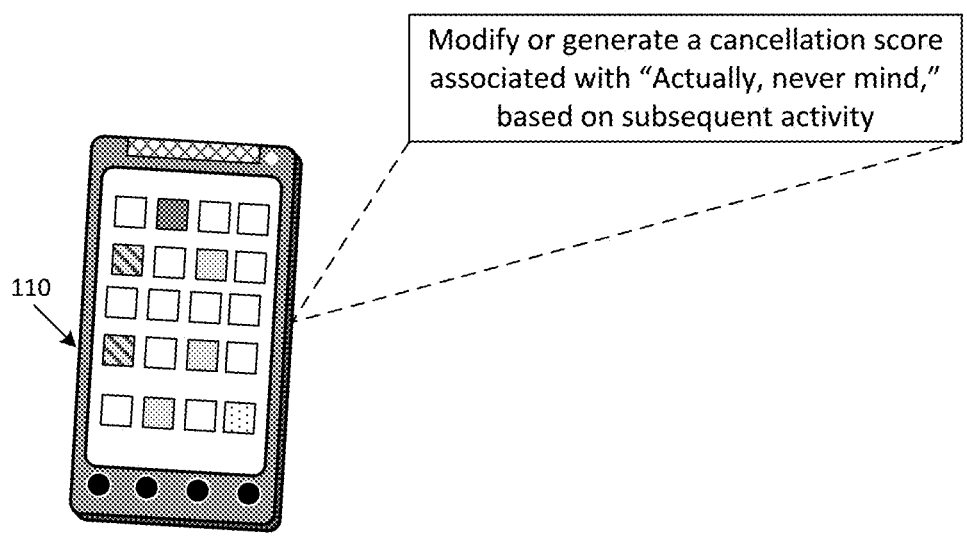

As shown in FIG. 1C, user 105 may provide the input "Actually, never mind" to user device 110 and proceed to perform subsequent action at the user device 110. As shown in FIG. 1D, and as further described below, user device 110 may identify that the input "Actually, never mind" has a cancellation score that satisfies a threshold, and is therefore to be classified as a cancellation command and not a clarification of the question asked in FIG. 1A. The user device 110 may exit the state in which user device 110 is conditioned to receive subsequent input from user 105, without processing the input "Actually, never mind" as a clarification to the question. Additionally, based on the activity performed at the user device 110 subsequent to the input "Actually, never mind," the device of some implementations may update the cancellation score associated with the input, "Actually, never mind" and store the updated cancellation score.

By processing the input as a cancellation command, user device 110 may avoid a scenario where user device 110 erroneously interprets "Actually, never mind" as a clarification to the question. In such a situation, user device 110 may interpret the question provided at FIG. 1A and the input provided at FIG. 1C together as the question "Who directed Indiana Jones: Actually, never mind," identify that there is not a good answer, and may engage in undesirable dialog with user 105, such as "I don't know who directed the movie 'Indiana Jones: Actually, never mind,'" or "I don't think there was an Indiana Jones movie with 'Actually, never mind' in the title."

Figure 2:
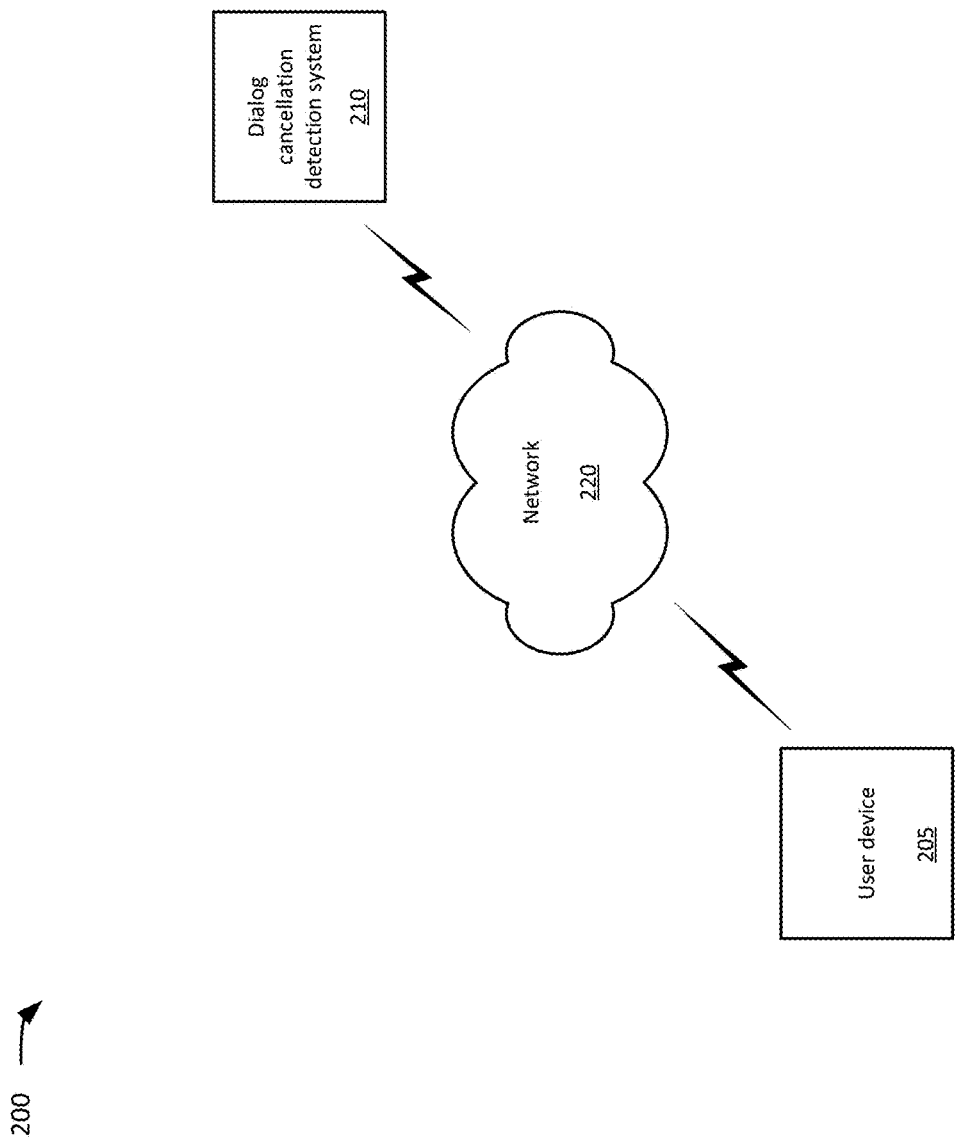
FIG. 2 illustrates an example environment in which systems and/or methods described herein may be implemented.

FIG. 2 is a diagram of an example environment 200 in which systems and/or methods described herein may be implemented. Environment 200 may include user device 205 and dialog cancellation detection system 210 connected to network 220. One user device 205 and one system 210 have been illustrated as connected to network 220 for simplicity. In practice, environment 200 may include additional user devices and/or systems or fewer user devices and/or systems. Also, in some instances, a user device may perform a function of a system, or a system may perform a function of a user device.

User device 205 may implement one or more functions of user device 110. User device 205 may include a client device, such as a mobile telephone, a personal computer, a personal digital assistant ("PDA"), a wearable computer, a tablet computer, a laptop, or any other type of computing or communication device. User device 205 may include audio input/output devices that allow a user to communicate with user device 205 via speech. For example, these audio input/output devices may include one or more microphones and/or one or more speakers. User device 205 may also include one or more visual input/output devices, such as one or more cameras and/or one or more display screens that are capable of presenting a user interface through which a user may interact.

Dialog cancellation detection system 210 may be implemented as a single server device or a collection of server devices that may be co-located or remotely located. Dialog cancellation detection system 210 may receive information regarding input received by user device 205 and/or output provided by user device 205, and may identify input received by user device 205 as cancellation commands. Dialog cancellation detection system 210 may provide information regarding the identified cancellation commands to user device 205, so that user device 205 may process the cancellation commands accordingly.

Additional servers, implementing other functions, may also be implemented in environment 200. For example, environment 200 may include a search engine server that performs searches based on queries, a log server that stores information regarding input received from users by user device 205, a log server that stores information regarding output provided by user device 205, and/or any other server. The additional servers may additionally, or alternatively, provide, for example, web content, payment services, shopping services, social networking services, etc.

Network 220 may include any type of network, such as a local area network ("LAN"), a wide area network ("WAN"), a telephone network, e.g., the Public Switched Telephone Network ("PSTN") or a cellular network, an intranet, the Internet, or a combination of networks. User device 205 and dialog cancellation detection system 210 may connect to network 220 via wired and/or wireless connections. In other words, user device 205 and/or dialog cancellation detection system 210 may connect to network 220 via a wired connection, a wireless connection, or a combination of a wired connection and a wireless connection.

Figure 3:
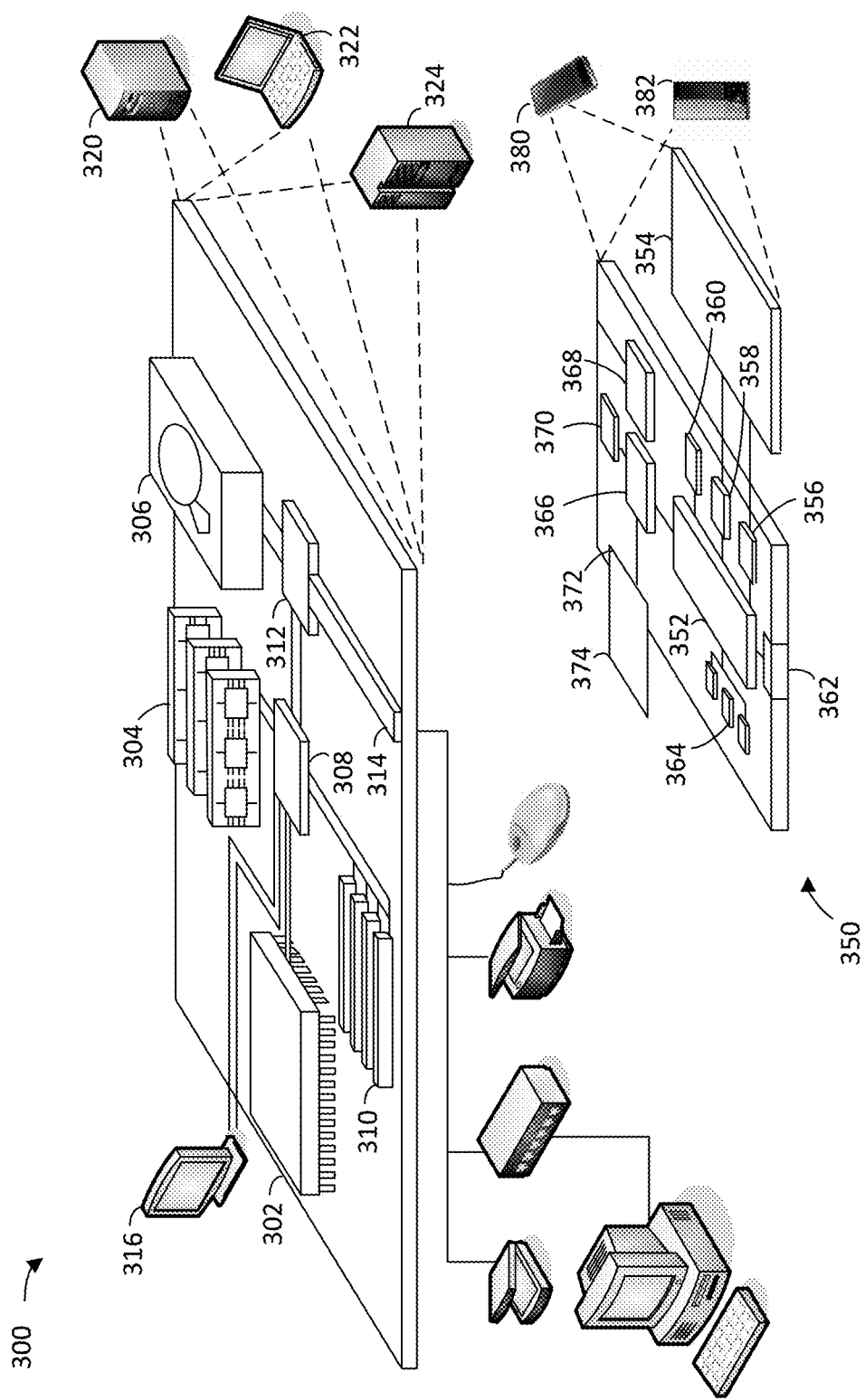
FIG. 3 illustrates an example of a generic computer device and a generic mobile computer device according to one or more implementations described herein.

FIG. 3 shows an example of generic computing device 300 and generic mobile computing device 350, which may be used with the techniques described here. Computing device 300 and mobile computing device 350 may correspond to, for example, any of user device 205 and/or dialog cancellation detection system 210. Each of user device 205 and/or dialog cancellation detection system 210 may include one or more computing devices 300, mobile computing devices 350, or components of computing device 300 and/or mobile computing device 350.

Computing device 300 is represents various forms of digital computers, such as laptops, desktops, workstations, personal digital assistants, servers, blade servers, mainframes, and other appropriate computers. Mobile computing device 350 represents various forms of mobile devices, such as personal digital assistants, cellular telephones, smart phones, and other similar computing devices. The components shown in FIG. 3, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In some implementations, memory 304 includes a volatile memory unit or units. In some implementations, memory 304 includes a non-volatile memory unit or units. The memory 304 may also be another form of computer-readable medium, such as a magnetic or optical disk. A computer-readable medium may be defined as a non-transitory memory device. A memory device may include space within a single physical memory device or spread across multiple physical memory devices.

Storage device 306 is capable of providing mass storage for the computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In some implementations, high-speed controller 308 is coupled to memory 304, display 316, e.g., through a graphics processor or accelerator, and to high-speed expansion ports 310, which may accept various expansion cards (not shown). In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a micro-drive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a Thin-Film-Transistor Liquid Crystal Display ("TFT LCD") or an Organic Light Emitting Diode ("OLED") display, or other appropriate display technology. Display interface 356 may include appropriate circuitry for driving display 354 to present graphical and other information to a user. Control interface 358 may receive commands from a user and convert them for submission to the processor 352. In addition, an external interface 362 may be in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module ("SIMM") card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, Global Positioning System ("GPS") receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refer to any non-transitory apparatus and/or device, e.g., magnetic discs, optical disks, memory, Programmable Logic Devices ("PLDs"), used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
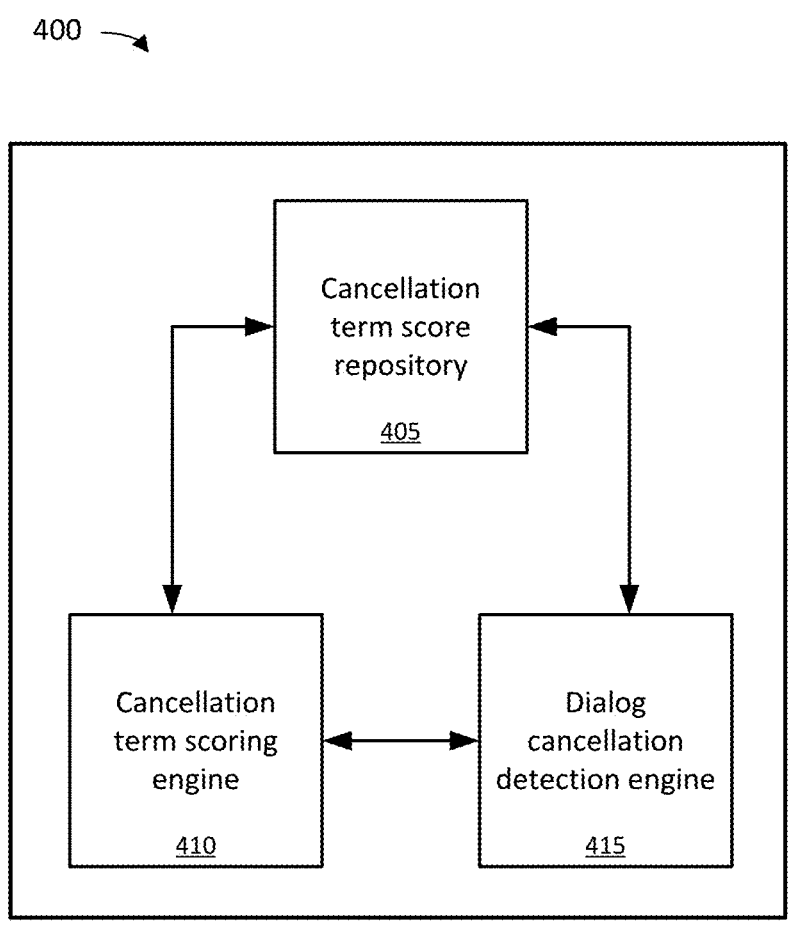
FIG. 4 illustrates example functional components of a dialog cancellation detection system according to one or more implementations described herein.

FIG. 4 illustrates example functional components of an example system 400. System 400 may correspond to, for instance, dialog cancellation detection system 210. As shown in FIG. 4, system 400 may include modules 405-415. In some implementations, system 400 may include fewer modules, additional modules, or different modules. Any, or all, of modules 405-415 may be implemented by one or more memory devices, such as memory 304 and/or memory 364, and/or one or more processors, such as processor 308 and/or processor 352. Furthermore, multiple modules may be associated with the same memory device and/or processor. For example, one memory device, or one set of memory devices, may store information associated with two or more of modules 405-415.

Cancellation term score repository 405 may store information regarding potential cancellation terms and scores associated with the potential cancellation terms. Cancellation term score repository 405 may receive some or all of the information from one or more users, cancellation term scoring engine 410, and/or one or more other devices that generate or modify information regarding potential cancellation terms and scores associated with the potential cancellation terms. FIGS. 5-7 illustrate example data structures that may be stored by cancellation term score repository 405. For instance, example data structure 500, shown in FIG. 5, may store information associating potential cancellation terms with cancellation scores. A particular cancellation score for a particular potential cancellation term may indicate the likelihood that a particular potential cancellation term should be interpreted as a cancellation command.

For example, the potential cancellation term "Never mind," shown in FIG. 5, may be associated with a cancellation score of 1.0, while the potential cancellation term "Tell me more" may be associated with a cancellation score of 0.1. The cancellation score of 1.0 may indicate that there is particular likelihood that "Never mind" corresponds to a cancellation command, while the cancellation score of 0.1 may indicate that there is different likelihood that "Tell me more" corresponds to a cancellation command.

Cancellation term score repository 405 may also store information regarding various states associated with user devices, such as user device 205. In some implementations, cancellation term score repository 405 may store example data structure 600, of FIG. 6, which may store such information. As shown in FIG. 6, data structure 600 may store information regarding states, whether cancellation commands should be processed as cancellation commands when in certain states, and whether exceptions apply when user device 205 is in states in which cancellation commands should be not be processed as cancellation commands.

The information regarding the various states may identify states, which, when user device 205 is in these states, may influence how potential cancellation terms should be processed by user device 205. In some states, it may be advantageous for user device 205 to forgo identifying potential cancellation terms as cancellation commands that may otherwise be identified as potential cancellation terms when in other states. In some states, it may be advantageous for user device 205 to forgo the identification of potential cancellation terms altogether, i.e., to exclude the processing of potential cancellation terms as cancellation commands. In some states, it may be advantageous for user device 205 to selectively process some potential cancellation terms as cancellation commands while forgoing the processing of other potential cancellation terms as cancellation commands.

For example, as shown in FIG. 6, data structure 600 may store information indicating that when user device 205 is in a state corresponding to a number input, user device 205 should not forgo the processing of potential cancellation terms as cancellation commands. Thus, based on the information stored by data structure 600, user device 205 may process potential cancellation terms in order to determine whether a cancellation command has been received. As also shown in FIG. 6, data structure 600 may store information indicating that when user device 205 is in a state corresponding to a telephone call in progress, user device 205 should exclude the processing of all potential cancellation terms as cancellation commands, with no exceptions.

As further shown in FIG. 6, data structure 600 may also store information indicating that when user device 205 is in an e-mail dictation state, in which user device 205 may receive voice input associated with an e-mail from a user, user device 205 may omit the processing of input potential cancellation terms as cancellation commands, with some exceptions. That is, when in an e-mail dictation state, user device 205 may forgo processing some potential cancellation terms as cancellation commands, while processing some potential cancellation terms as cancellation commands. For instance, a user may desire that an e-mail include the word "cancel," in which it should not be processed by user device 205 as a cancellation command, while the word "cancel" may more likely be processed as a cancellation command when the user is inputting numbers while user device 205 is in a number dictation mode.

FIG. 7 illustrates an example data structure 700 which may be used when processing some potential cancellation terms as cancellation commands while in certain states. For example, as mentioned above with respect to FIG. 6, data structure 600 may store information indicating that when user device 205 is in an e-mail dictation state, user device 205 may forgo processing potential cancellation terms as cancellation commands, with some exceptions. Data structure 700 may store information regarding such exceptions. For example, information stored by data structure 700 may indicate that when user device 205 is in an e-mail dictation state, the potential cancellation term "cancel e-mail" is associated with a cancellation score of 0.9, e.g., a value that indicates a certain probability that the potential cancellation term is associated with a cancellation command, and that the potential cancellation term "computer cancel" is associated with a cancellation score of 0.6, e.g., a value that indicates a different probability, than would be indicated by a score of 0.9, that the potential cancellation term is associated with a cancellation command.

While example data structures 500, 600, and 700 were described above in the context of tables with rows and columns, in practice, one or more of data structures 500, 600, and/or 700 may include any other type of data structure. For example, one or more of data structures 500, 600, and/or 700 may include one or more linked lists, binary search trees, hash tables, arrays, and/or any other type of data structure. Furthermore, in some implementations, one or more of data structures 500, 600, and/or 700 may include additional, different, or less information than the information shown in FIGS. 5-7. Additionally, while example data structures 500, 600, and 700 were described above using the presented cancellation scores and scoring method, in practice, one or more data structures 500, 600, and/or 700 may utilize any other cancellation scores or cancellation scoring method, e.g., a binary scoring method, an integer scoring method, scoring methods with different maximum and minimum cancellation score values, scoring methods assigning a particular cancellation term a higher value, a lower value, or nearer to a particular value, etc.

Cancellation term scoring engine 410 may generate or modify cancellation scores associated with potential cancellation terms. Cancellation term scoring engine 410 may generate or modify cancellation scores based on, for example, information regarding subsequent activity that is identified after a potential cancellation term is detected and classified as being a cancellation command or as not a cancellation command. Cancellation term scoring engine 410 may receive the information regarding the subsequent activity from user device 205, a log that stores information regarding interactions between users and user devices, and/or from any other device.

For example, the subsequent activity may include a user's feedback to prompts requesting information regarding potential cancellation terms. For example, a user may indicate that a particular potential cancellation term is not a cancellation command. Cancellation term scoring engine 410 may generate a cancellation score associated with the particular potential cancellation term, or may identify and modify a cancellation score associated with the particular potential cancellation term, in a manner that reflects that the particular potential cancellation term should not be identified and processed as a cancellation command. In some implementations, cancellation term scoring engine 410 may generate a new score for the particular potential cancellation term based on the subsequent activity.

As another example, a user may indicate that a particular potential cancellation term signifies a cancellation command. Cancellation term scoring engine 410 may generate or modify a cancellation score associated with the particular potential cancellation term in a manner that reflects that the particular potential cancellation term should be processed as a cancellation command. For example, cancellation term scoring engine 410 may identify a cancellation score that is associated with the particular potential cancellation term and is stored by cancellation term score repository 405. Cancellation term scoring engine 410 may modify the identified cancellation score associated with the particular potential cancellation term to reflect, for example, that the particular potential cancellation term is more likely to represent a cancellation command. In some implementations, cancellation term scoring engine 410 may generate a new score for the particular potential cancellation term based on the subsequent activity.

In some implementations, the subsequent activity may include any other type of input or activity performed at user device 205 after the user device processes input as a cancellation command and/or forgoes processing input as a cancellation command. For example, the subsequent activity may include accessing a web page, making a telephone call, sending an e-mail, accessing video content, etc.

In some implementations, cancellation term scoring engine 410 may adjust cancellation scores differently based on different types of subsequent activity. For example, cancellation term scoring engine 410 may adjust a cancellation score by a first amount when the subsequent activity includes accessing a web page, and may adjust a cancellation score by a second, different amount when the subsequent activity includes creating an e-mail. In some implementations, cancellation term scoring engine 410 may provide generated or modified cancellation scores to cancellation term score repository 405 and/or to any other device.

The dialog cancellation detection engine 415 may receive information regarding a state, e.g., a state associated with user device 205, and input provided to user device 205. Dialog cancellation detection engine 415 may receive information regarding the state and/or input from user device 205, a log that stores information regarding states and/or input provided by users to one or more user devices, and/or from any other device. In order to determine whether a particular state and/or a particular input should be categorized and responded to as a cancellation command, dialog cancellation detection engine 415 may compare the state and/or some or all of the particular input to information received from cancellation term score repository 405. For example, dialog cancellation detection engine 415 may identify whether one or more terms, included in the particular input, correspond to one or more potential cancellation terms associated with information received from cancellation term score repository 405, and/or whether the state of user device 205 corresponds to a state identified by the information received from cancellation term score repository 405.

Dialog cancellation detection engine 415 may identify, based on the information received from cancellation term score repository 405, a cancellation score associated with a potential cancellation term and/or an identified state. Dialog cancellation detection engine 415 may determine, based on the cancellation score and/or the identified state, whether to process the potential cancellation term as a cancellation command. For example, if the cancellation score satisfies a first threshold score, dialog cancellation detection engine 415 may identify that the potential cancellation term should be processed as a cancellation term resulting in a cancellation action. Dialog cancellation detection engine 415 may output an indication that the potential cancellation term is a cancellation command to, e.g., user device 205, cancellation term score repository 405, and/or cancellation term scoring engine 410. User device 205 may process the cancellation command by, for example, exiting a current state associated with user device 205.

In some implementations, if the cancellation score does not satisfy the first threshold score, dialog cancellation detection engine 415 may determine whether the cancellation score satisfies a second threshold score that is different than the first threshold score. If the cancellation score satisfies the second threshold score but does not satisfy the first threshold score, dialog cancellation detection engine 415 may consider the potential cancellation term as a potential cancellation command for which further clarification may be necessary. For example, dialog cancellation detection engine 415 may output information, e.g., to user device 205, requesting further clarification for the potential cancellation. Dialog cancellation detection engine 415 may additionally, or alternatively, output an indication that the potential cancellation term may be a potential cancellation for which further clarification may be necessary to, e.g., cancellation term score repository 405 and/or cancellation term scoring engine 410.

In some implementations, if the cancellation score does not satisfy the first threshold, dialog cancellation detection engine 415 may determine that the potential cancellation term should not be processed as a cancellation command. That is, in such implementations, potential cancellation terms that are associated with cancellation scores that satisfy the first threshold may be processed as cancellation commands, while potential cancellation terms that are associated with cancellation scores that do not satisfy the first threshold may not be processed as cancellation commands.

User device 205 may provide a prompt requesting user feedback regarding whether the potential cancellation term was input as a cancellation command. User device 205 may process the potential cancellation term as a cancellation command, or forgo processing the potential cancellation term as a cancellation command, based on the feedback. User device 205 may output information regarding the feedback to, for example, cancellation term scoring engine 410, as described above.

In some implementations, if the cancellation score associated with a particular potential cancellation term does not satisfy the first threshold score and also does not satisfy the second threshold score, dialog cancellation detection engine 415 may identify that the potential cancellation term should not be processed as a cancellation command. Based on identifying that the potential cancellation term is not a cancellation command, dialog cancellation detection engine 415 may output an indication, to, e.g., user device 205, cancellation term score repository 405, and/or cancellation term scoring engine 410, indicating that that the potential cancellation term is not recognized as a cancellation command. In some implementations, dialog cancellation detection engine 415 may forgo outputting an indication, to user device 205, cancellation term score repository 405, and/or cancellation term scoring engine 410, indicating that the potential cancellation term is not recognized as a cancellation command. Based on receiving the indication that the potential cancellation term is not recognized as a cancellation command, and/or based on not receiving an indication that the potential cancellation term is recognized as a cancellation command, user device 205 may forgo processing the potential cancellation term as a cancellation command. In some implementations, user device 205 may remain in a previous state without processing the potential cancellation term as a cancellation command.

As an example, dialog cancellation detection engine 415 may receive information identifying that the input "Never mind" is received by user device 205 while user device 205 is in a state associated with a question clarification. Referring to the example information shown in FIGS. 5 and 6, dialog cancellation detection engine 415 may identify that dialog cancellation detection engine 415 should not forgo processing potential cancellation terms as cancellation commands when in this state, and that the potential cancellation term "Never mind" is associated with a particular cancellation score. In response to this determination, dialog cancellation detection engine 415 may identify that this cancellation score satisfies a first threshold cancellation score. Dialog cancellation detection engine 415 may output an indication to, e.g., user device 205, based on identifying that the cancellation score satisfies the first threshold cancellation score. Based on this indication, user device 205 may process the input "Never mind" as a cancellation command, e.g., user device 205 may exit a current state.

As another example, dialog cancellation detection engine 415 can receive information identifying that the input "Cancel e-mail" was received by user device 205 while user device 205 is in an e-mail dictation state. Referring to the example information shown in FIGS. 5 and 6, dialog cancellation detection engine 415 may identify that dialog cancellation detection engine 415 should omit the processing of potential cancellation terms as cancellation commands while in this state, and that exceptions may apply. Referring to the example information shown in FIG. 7, one such exception may include the potential cancellation term "Cancel e-mail." Dialog cancellation detection engine 415 may identify that, when the state is an e-mail dictation state, the potential cancellation term "Cancel e-mail" is associated with a particular cancellation score. Dialog cancellation detection engine 415 can identify that this cancellation score satisfies a first threshold cancellation score. Dialog cancellation detection engine 415 may output an identification to, e.g., user device 205, based on identifying that the cancellation score is in satisfaction of the first threshold cancellation score. Based on this indication, user device 205 may process the input "Cancel e-mail" as a cancellation command, e.g., may exit a current state associated with user device 205.

As yet another example, dialog cancellation detection engine 415 may receive information identifying that the input "Never mind" was received by user device 205 while user device 205 is in a state associated with a telephone call in progress. Referring to the example information shown in FIGS. 5 and 6, dialog cancellation detection engine 415 may identify that dialog cancellation detection engine 415 should forgo the processing of potential cancellation terms as cancellation commands when in this state. In some implementations, based on identifying that dialog cancellation detection engine 415 should forgo the identification of potential cancellation terms as cancellation commands when in this state, dialog cancellation detection engine 415 may process the potential cancellation term "Never mind" as if the potential cancellation term were associated with a cancellation score that does not satisfy a second threshold score. Dialog cancellation detection engine 415 may output an indication to, e.g., user device 205, based on identifying that the potential cancellation term is not a cancellation command, and/or may forgo outputting an indication based on identifying that the potential cancellation term is not a cancellation command.

While the examples provided above regard receiving input that matches potential cancellation terms associated with information stored by cancellation term score repository 405, dialog cancellation detection engine 415 may identify cancellation scores associated with input that does not exactly match potential cancellation terms associated with information stored by cancellation term score repository 405. In some implementations, dialog cancellation detection engine 415 may identify cancellation scores associated with input that is similar, beyond a threshold similarity, to potential cancellation terms associated with information stored by cancellation term score repository 405. In order to identify input that is similar to potential cancellation terms associated with information stored by cancellation term score repository 405, dialog cancellation detection engine 415 may use one or more similarity detection techniques, such as edit distance, hamming distance, semantic similarity, and/or any other technique.

For example, a dialog cancellation detection engine 415 identifies that the input "Actually forget about that" has been received, e.g., by user device 205. Referring to the example shown in FIG. 5, dialog cancellation detection engine 415 may identify that the input "Actually forget about that" is similar, beyond a threshold similarity, to the potential cancellation term "Actually forget that," associated with information stored by cancellation term score repository 405. Dialog cancellation detection engine 415 may identify that a particular cancellation score is associated with "Actually forget that," and may process the input "Actually forget about that" based on the particular cancellation score. For example, dialog cancellation detection engine 415 may identify that the particular cancellation score satisfies a first threshold score, and may output an indication to, e.g., user device 205, cancellation term score repository 405, and/or cancellation term scoring engine 410 based on identifying that the cancellation score associated with "Actually forget about that" satisfies the first threshold score. Based on receiving this indication, user device 205 may process "Actually forget about that" as a cancellation command.

As another example, dialog cancellation detection engine 415 identifies that the input "Continue" has been received, e.g., by user device 205, and that the input "Continue" is not found in, and/or is not similar to, potential cancellation terms associated with information stored by cancellation term score repository 405. Dialog cancellation detection engine 415 may output an indication to, e.g., user device 205, based on identifying that the input "Continue" is not a cancellation command, and/or may forgo outputting an indication based on identifying that the input "Continue" is not a cancellation command. Additionally, or alternatively, dialog cancellation detection engine 415 may output an indication, e.g., to cancellation term score repository 405 and/or cancellation term scoring engine 410, based on identifying that the input "Continue" is not processed as a cancellation command.

Figure 8:
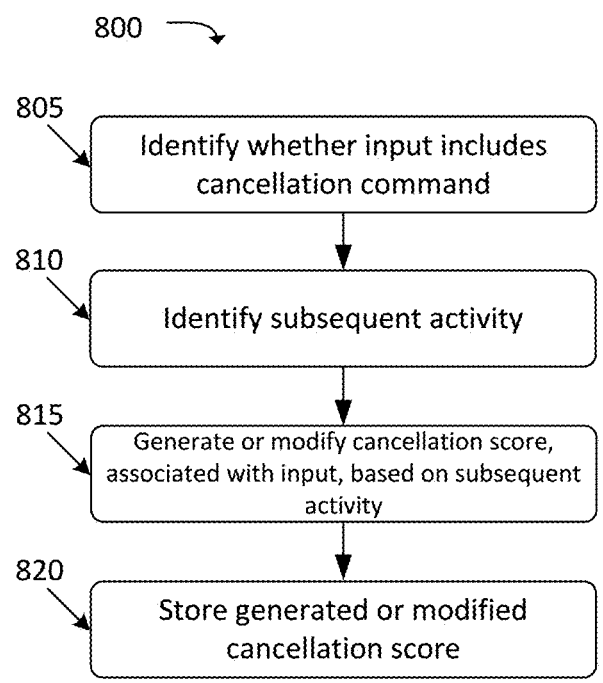
FIG. 8 illustrates a flowchart of an example process for modifying scores associated with potential cancellation terms based on subsequent activity, according to one or more implementations described herein.

FIG. 8 illustrates a flowchart of an example process 800 for determining and modifying scores associated with potential cancellation user inputs based on subsequent activity. In some implementations, process 800 may be performed by one or more components of dialog cancellation detection system 210. In some implementations, some or all of process 800 may be performed by one or more other components instead of, or possibly in conjunction with, dialog cancellation detection system 210. For example, in some implementations, some or all of process 800 may be performed by user device 205.

Process 800 may include identifying whether an input includes a potential cancellation command (block 805). For example, as discussed above, dialog cancellation detection system 210 may identify whether an input received from, for instance, user device 205, includes a potential cancellation command.

Process 800 may also include identifying subsequent activity (block 810). For example, as discussed above with respect to cancellation term scoring engine 410, dialog cancellation detection system 210 may identify subsequent activity at user device 205 after user device 205 processes, or forgoes processing, an input as a cancellation command. Activities performed at the user device subsequent to an input are identified and utilized to determine if a user 105 performed activity consistent with a cancellation command after providing to the input.

For example, if a user 105 provides the input, "Actually, never mind," in response to a request by user device 205 to clarify an input, dialog cancellation system 210 may identify whether or not "Actually, never mind" is being utilized by the user as a cancellation term based upon subsequent activity performed at the user device 205. As discussed above, subsequent activity may include, for example, a user's response to a prompt from user device 205 requesting clarification of a potential cancellation command, accessing a web page, making a telephone call, sending an e-mail, accessing video content, or any other type of activity.

Process 800 may further include generating or modifying a cancellation score associated with the input, based on the subsequent activity (block 815). For example, as described above with respect to cancellation term scoring engine 410, dialog cancellation detection system 210 may identify one or more potential cancellation terms and modify cancellation scores associated with the one or more potential cancellation terms based on the subsequent activity. Additionally, dialog cancellation detection system 210 may modify a cancellation score associated with a potential cancellation term by a differing amount based on determining by the dialog cancellation detection system 210 that the activity subsequent to the user input containing the potential cancellation term is a greater or lesser indication of an attempt to affect a cancellation command. For example, if the user 105 provides the input, "Actually, never mind," to a user device 205 as in FIG. 1 and subsequently proceeds to power off the user device 205, the cancellation score associated with the potential cancellation term, "Actually, never mind," may be modified by a different amount than if the user had provided the input, "Actually, never mind," and subsequently opened a web browser, based on identifying that the powering off of a user device is a greater indication of a cancellation command than is the opening of a web browser. Additionally, or alternatively, cancellation term scoring engine 410 may generate a score for the input based on the subsequent activity, where the cancellation score generated for the input may vary based on identifying, by the cancellation term scoring engine 410, that the input is a greater or lesser indication of an attempt to affect a cancellation command. With respect to cancellation term scoring engine 410, dialog cancellation detection system 210 may additionally or alternatively modify and/or generate cancellation scores associated with one or more potential cancellation terms by different amounts based upon the state of user device 205 at the time of the user input and/or activity, or any combination of the device state and the subsequent activity, where the subsequent activity may additionally or alternatively comprise activity performed at the user device prior to or concurrent with user input.

Process 800 may additionally include storing the generated or modified cancellation score (block 820). For example, dialog cancellation detection system 210 may store the generated or modified cancellation score in a repository, such as cancellation term score repository 405.

Figure 9A:
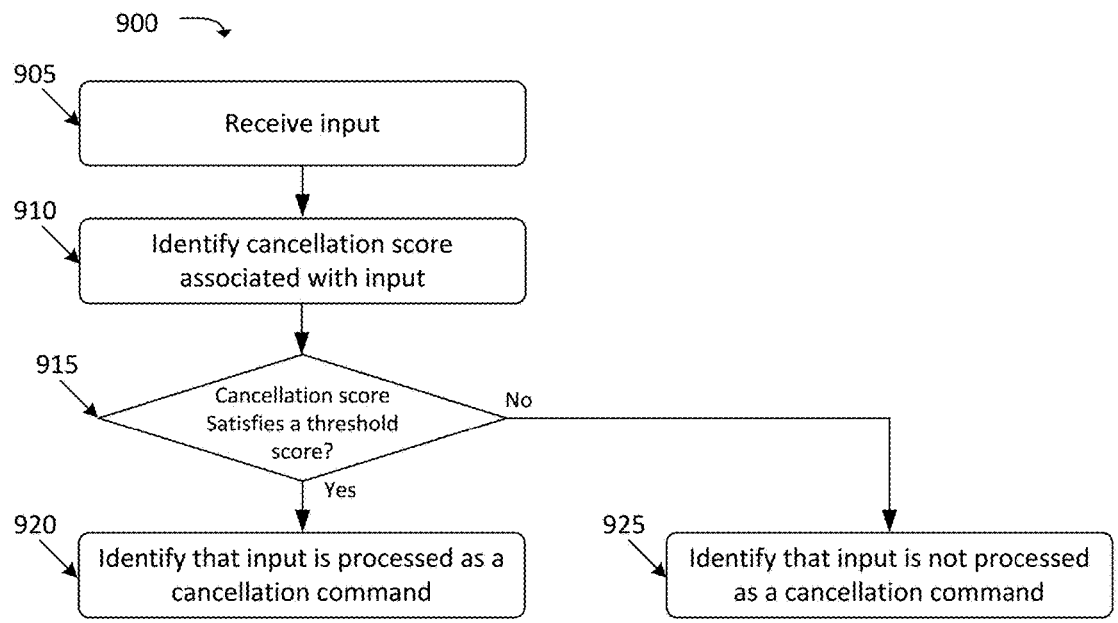
FIGS. 9A and 9B illustrate flowcharts of example processes for determining whether input includes a cancellation command, according to one or more implementations described herein.

FIG. 9A illustrates a flowchart of an example process 900 for determining whether input includes a cancellation command, according to some implementations. In some implementations, process 900 may be performed by one or more components of dialog cancellation detection system 210. In some implementations, some or all of process 900 may be performed by one or more other components instead of, or possibly in conjunction with, dialog cancellation detection system 210. For example, in some implementations, some or all of process 900 may be performed by user device 205.

Process 900 may include receiving input (block 905). For example, dialog cancellation detection system 210 may receive input from, for instance, user device 205. The input may correspond to, for example, commands issued to user device 205 by a user, questions asked to user device 205 by the user, or any other input.

Process 900 may also include identifying a cancellation score associated with the input (block 910). For example, as described above with respect to dialog cancellation detection engine 415, dialog cancellation detection system 210 may identify a cancellation score associated with a potential cancellation term that is identical to or similar to the input.

Process 900 may further include determining whether the cancellation score satisfies a threshold score (block 915). If the cancellation satisfies the first threshold score (block 915—YES), then process 900 may include identifying that the input is processed as a cancellation command (block 920). For example, as described above with respect to dialog cancellation detection engine 415, dialog cancellation detection system 210 may output an indication to user device 205 that the input (received at block 905) is a cancellation command. User device 205 may process the cancellation command by, for example, exiting a present device state in which user device 205 is currently operating. Dialog cancellation detection system 210 may additionally, or alternatively, output the indication to one or more other devices, such as a log that stores information regarding whether potential cancellation terms are identified as cancellation terms.

If, on the other hand, the cancellation does not satisfy the threshold score (block 915—NO), then process 900 may include identifying that the input is not processed as a cancellation command (block 925). For example, as described above with respect to dialog cancellation detection engine 415, dialog cancellation detection system 210 may output an indication to user device 205 that the input (received at block 905) is not a cancellation command. Based on this indication, user device 205 may forgo exiting a present device state in which user device 205 is currently operating. Dialog cancellation detection system 210 may additionally, or alternatively, output the indication to one or more other devices, such as a log that stores information regarding whether potential cancellation terms are identified as cancellation terms. Additionally, or alternatively, dialog cancellation detection system 210 may forgo outputting the indication to user device 205 and/or to one or more other devices.

Figure 9B:
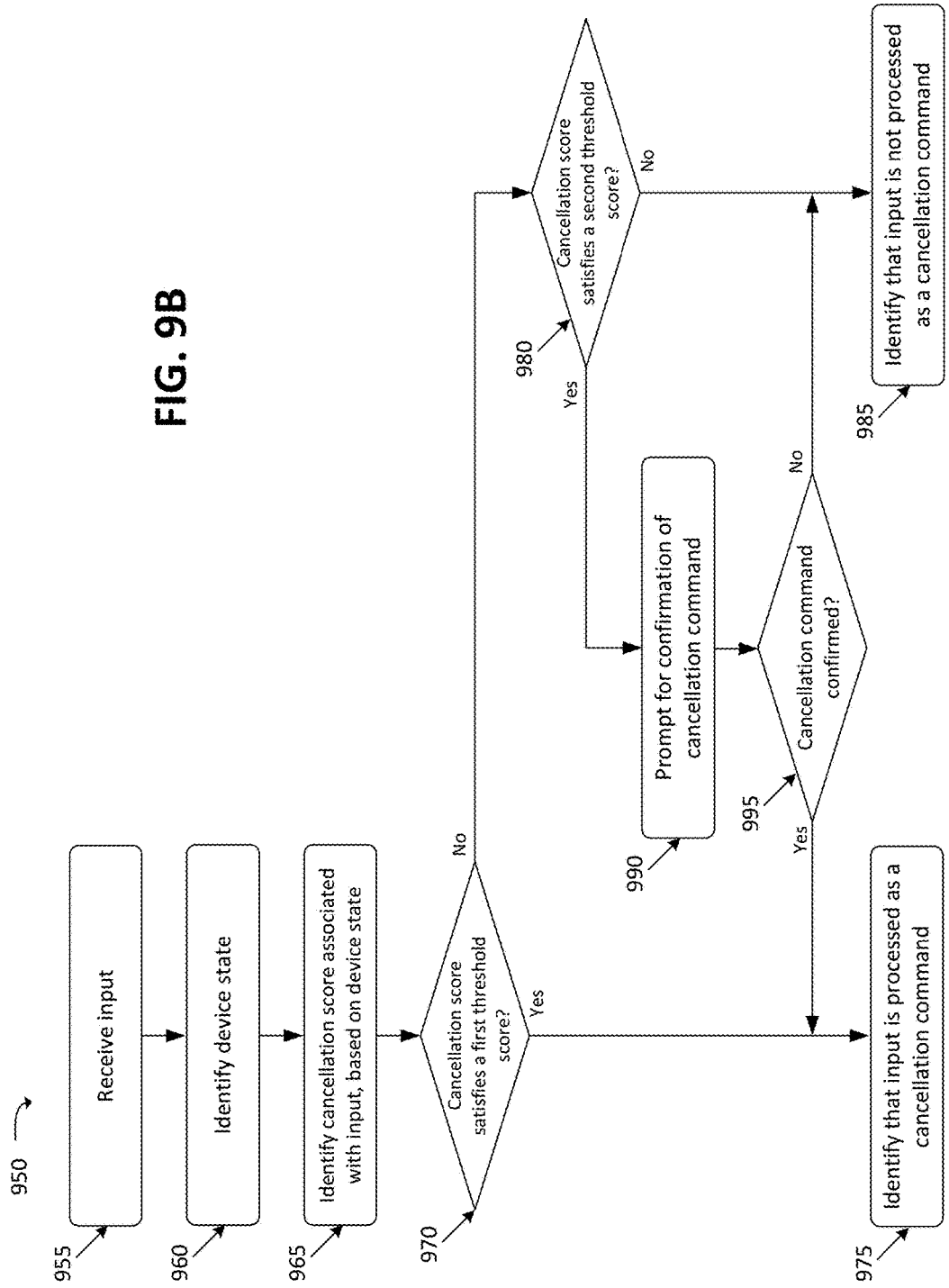

FIG. 9B illustrates a flowchart of another example process 950 for determining whether input includes a cancellation command, according to some implementations. In some implementations, process 950 may be performed by one or more components of dialog cancellation detection system 210. In some implementations, some or all of process 950 may be performed by one or more other components instead of, or possibly in conjunction with, dialog cancellation detection system 210. For example, in some implementations, some or all of process 950 may be performed by user device 205.

Process 950 may include receiving input (block 955). For example, dialog cancellation detection system 210 may receive input from, for instance, user device 205. The input may correspond to, for example, commands issued to user device 205 by a user, questions asked to user device 205 by the user, or any other input.

Process 950 may also include identifying a device state (block 960). For example, as described above with respect to dialog cancellation detection engine 415, dialog cancellation detection system 210 may receive information regarding a state, e.g., a state associated with a user device. Referring to the examples shown in FIG. 6, the received state may include an e-mail dictation state, a Short Messaging Service ("SMS") dictation state, a question clarification state, a number input state, a telephone call in progress state, or the like. Dialog cancellation detection system 210 may identify that the device state is a state in which user device 205 is currently receiving or is waiting for input. For example, dialog cancellation detection system 210 may identify that the device state is associated with a state for which information is stored in data structure 600 by cancellation term score repository 405.

Process 950 may additionally include identifying a cancellation score associated with the input, based on the device state (block 965). For example, as described above with respect to dialog cancellation detection engine 415, dialog cancellation detection system 210 may identify a cancellation score associated with a potential cancellation term that is identical to or similar to the input. As also discussed above, dialog cancellation detection system 210 may assign a different score to the input based on the device state (identified at block 960). For example, if the input matches a particular potential cancellation term, and user device 205 is in a state in which potential cancellation terms should not be processed as cancellation commands, dialog cancellation detection system 210 may assign a different score to the input than a cancellation score associated with the particular potential cancellation term. For example, if the cancellation score associated with the particular cancellation term is 1.0, dialog cancellation detection system 210 may assign a different score than 1.0 to the term, based on identifying that user device 205 is in a state in which potential cancellation terms should not be processed as cancellation commands, such as 0.0, −1.0, −100, or any other value that reflects that user device 205 is in a state in which potential cancellation terms are not identified and processed as cancellation commands.

Process 950 may further include determining whether the identified cancellation score satisfies a first threshold score (block 970). If the identified cancellation score satisfies the first threshold score (block 970—YES), then process 950 may include identifying that the input associated with the identified cancellation score is a cancellation command (block 975). For example, as described above with respect to dialog cancellation detection engine 415, dialog cancellation detection system 210 may output an indication to user device 205 that the input (received at block 955) is a cancellation command. User device 205 may process the cancellation command by, for example, exiting a present device state in which user device 205 is currently operating. Dialog cancellation detection system 210 may additionally, or alternatively, output the indication to one or more other devices, such as a log that stores information regarding whether potential cancellation terms are identified as cancellation terms.

If, on the other hand, the identified cancellation score does not satisfy the first threshold score (block 970—NO), then process 950 may include determining whether the identified cancellation score satisfies a second threshold score (block 980). As described above with respect to dialog cancellation detection engine 415, the second threshold score may be different, e.g., lower than or greater than, the first threshold score.

If the identified cancellation score does not satisfy the second threshold score (block 980—NO), then process 950 may include identifying that the input associated with the identified cancellation score is not a cancellation command (block 985). For example, as described above with respect to dialog cancellation detection engine 415, dialog cancellation detection system 210 may output an indication to user device 205 that the input (received at block 955) is not a cancellation command. Based on this indication, user device 205 may forgo exiting a present device state in which user device 205 is currently operating. Dialog cancellation detection system 210 may additionally, or alternatively, output the indication to one or more other devices, such as a log that stores information regarding whether potential cancellation terms are identified as cancellation terms. Additionally, or alternatively, dialog cancellation detection system 210 may forgo outputting the indication to user device 205 and/or to one or more other devices.

If, on the other hand, the identified cancellation score satisfies the second threshold score (block 980—YES) and the cancellation score does not satisfy the first threshold score (block 970—NO), then process 950 may include prompting for confirmation of a cancellation command (block 990). For example, as described above with respect to dialog cancellation detection engine 415, dialog cancellation detection system 210 may output an indication to user device 205 to prompt the user for a confirmation of the cancellation command.

If the cancellation command is confirmed (block 995—YES), then process 950 may include identifying that the input associated with the identified cancellation score is a cancellation command (block 975). If, on the other hand, the cancellation command is confirmed (block 995—NO), then process 950 may include identifying that the input associated with the identified cancellation score is not a cancellation command (block 985).

Figure 10A:
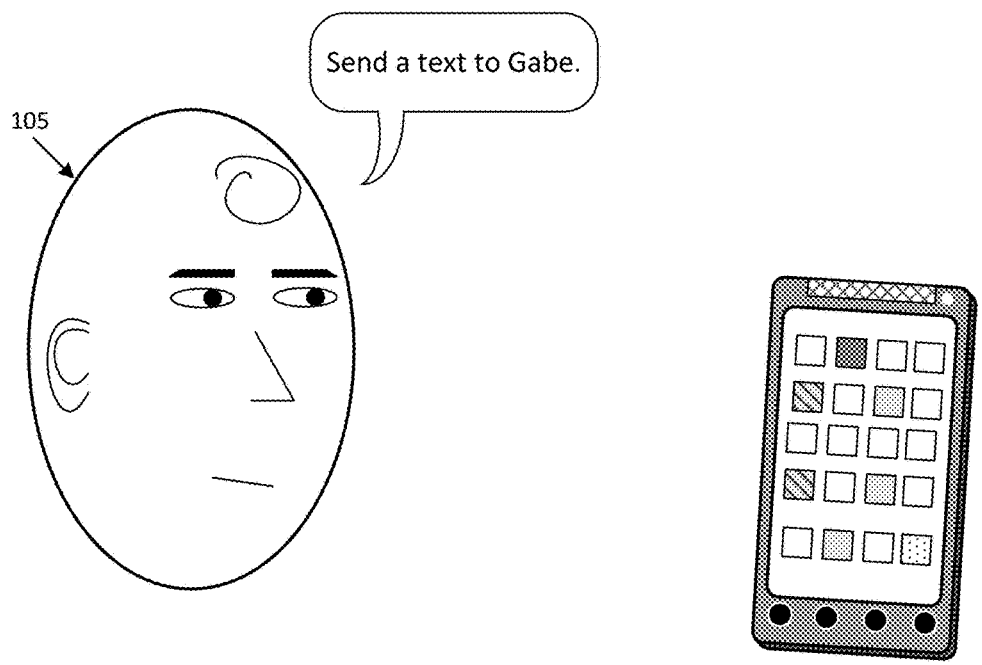
FIGS. 10A-13B illustrate examples of processing input as potential cancellation terms, according to one or more implementations described herein.
Figure 10B:
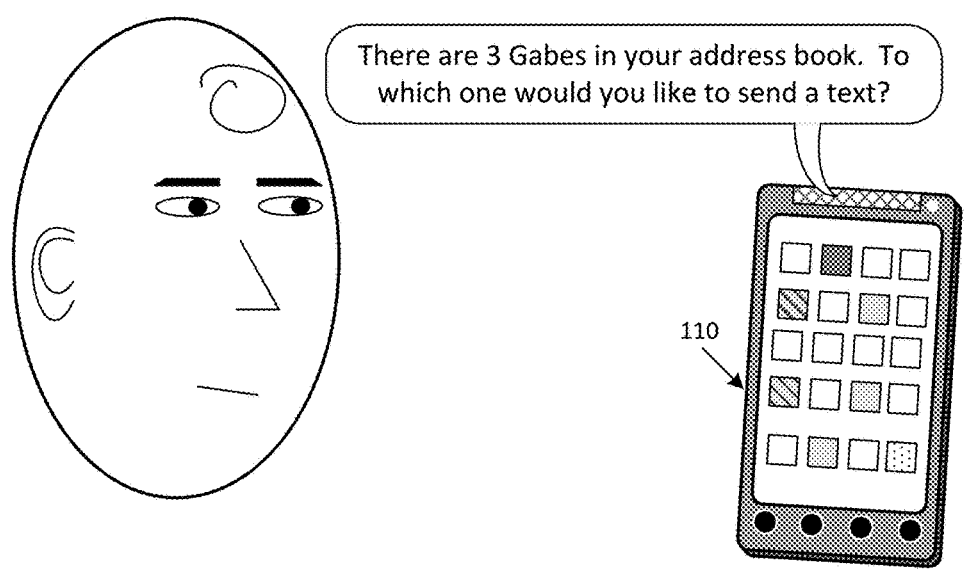

FIGS. 10A-10F illustrate an example of generating or modifying a cancellation score based on subsequent activity. As shown in FIG. 10A, user 105 may provide the input "Send a text to Gabe." As shown in FIG. 10B, user device 110 may prompt user 105 for a clarification to the input by outputting the phrase "There are 3 Gabes in your address book. To which one would you like to send a text?" User device 110 may enter a state in which user device 110 is able to receive input from user 105, e.g., clarifying input specifying to which "Gabe" user 105 would like to send a text.

Figure 10C:
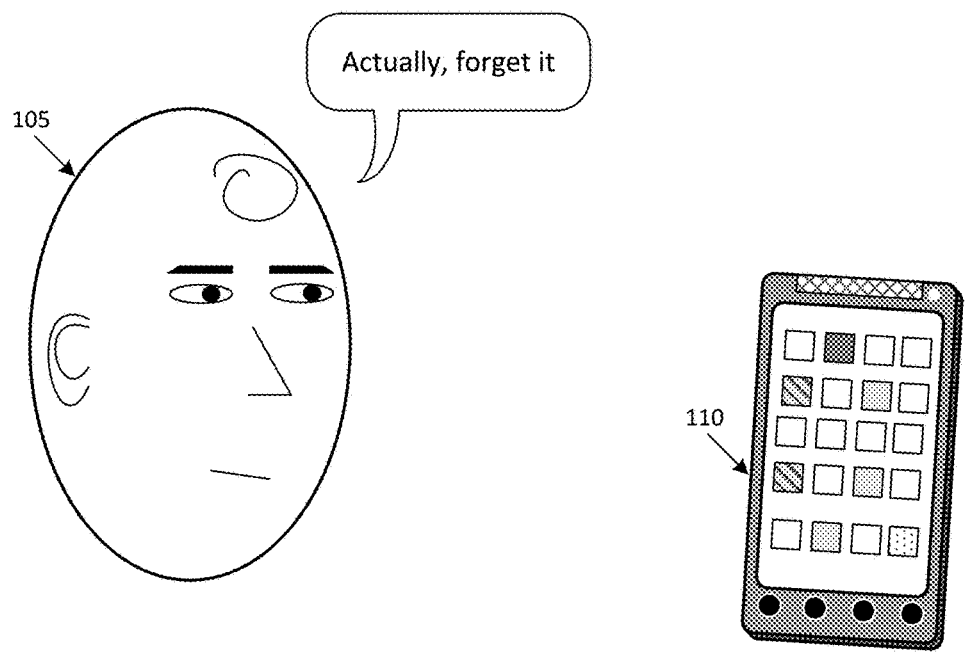
Figure 10D:
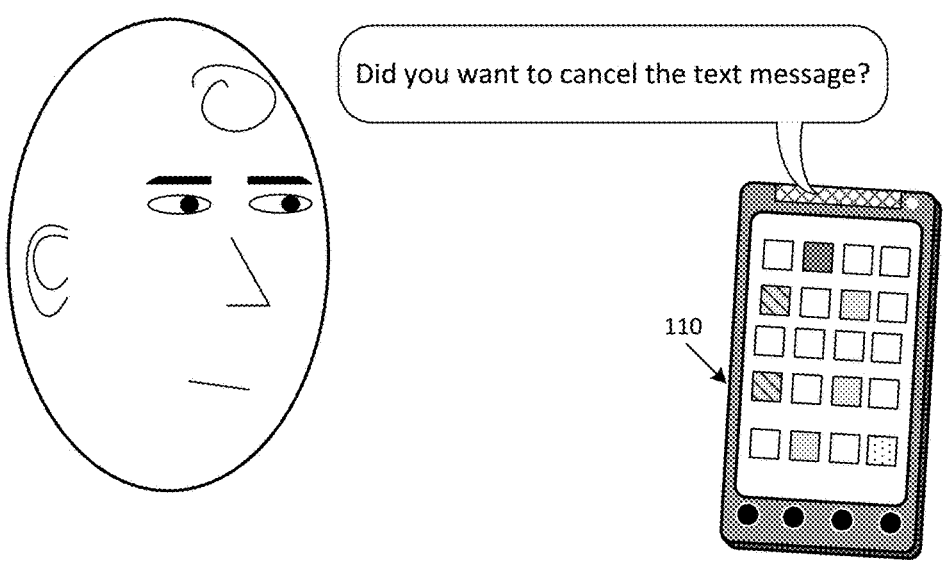

As shown in FIG. 10C, user 105 may provide the input "Actually, forget it" while user device 110 is in the state in which user device 110 is able to receive input from user 105. User device 105 may provide the input to, for example, dialog cancellation detection system 210, which may identify if the cancellation score associated with the input requires the input be processed as a cancellation command. Dialog cancellation detection system 210 may output an indication to user device 110 to prompt the user for confirmation of whether the input was provided as a cancellation command. As shown in FIG. 10D, user device 110 may output the phrase "Did you want to cancel the text message?"

Figure 10E:
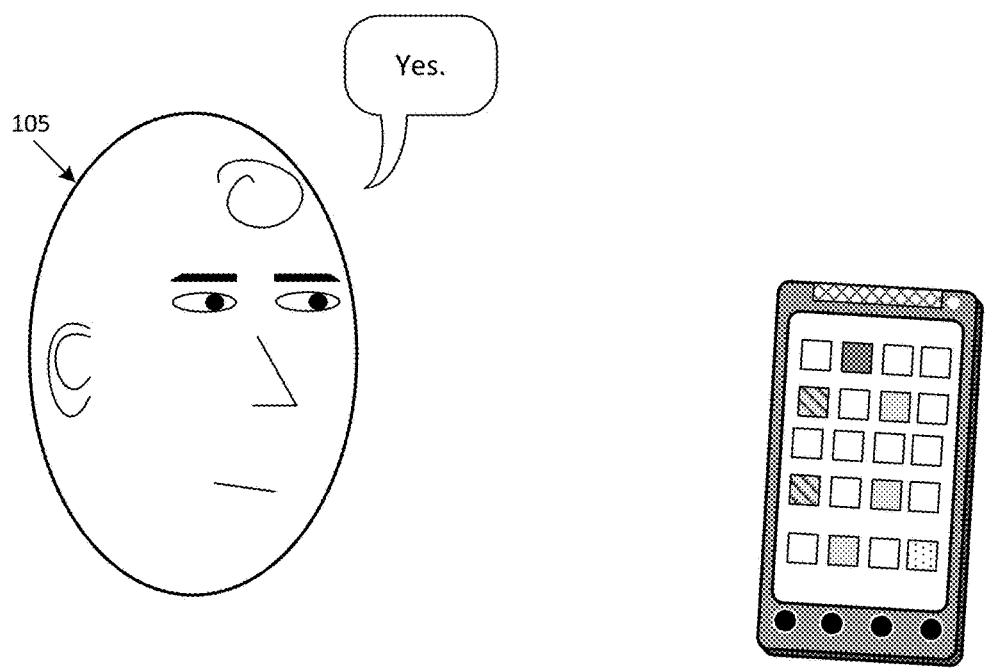
Figure 10F:
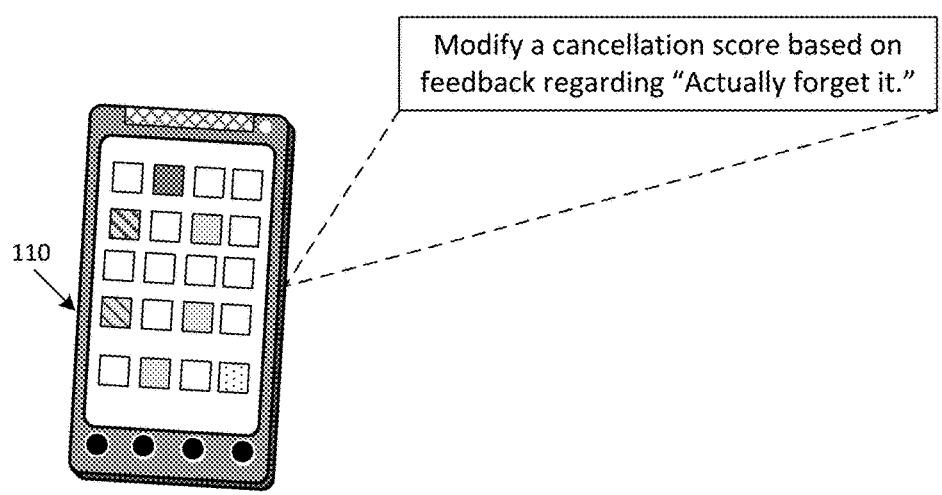

As shown in FIG. 10E, user 105 may confirm that the input corresponds to a cancellation command by speaking the word "Yes." As shown in FIG. 10F, user device 110 may provide information indicating that user 105 confirmed the cancellation command to, for example, dialog cancellation detection system 210. As described above, dialog cancellation detection system 210 may modify a cancellation score for the potential cancellation term "Actually forget it" based on the confirmation provided by the user. For example, dialog cancellation detection system 210 may modify the cancellation score for the potential cancellation term "Actually forget it," since the user confirmed that the input "Actually forget it" was indicated by the user as a cancellation command.

Figure 11A:
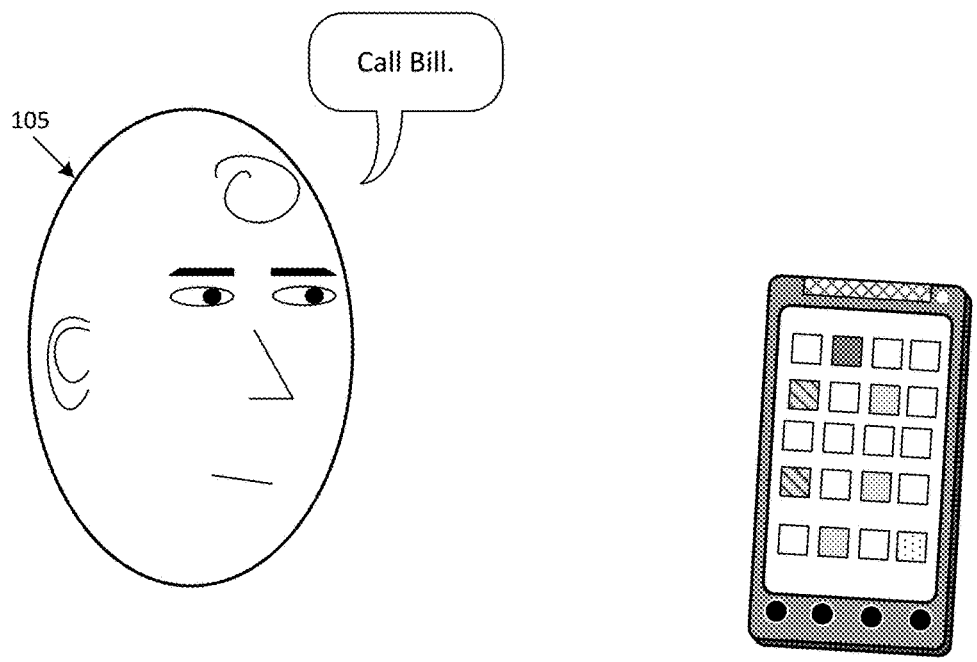
Figure 11B:
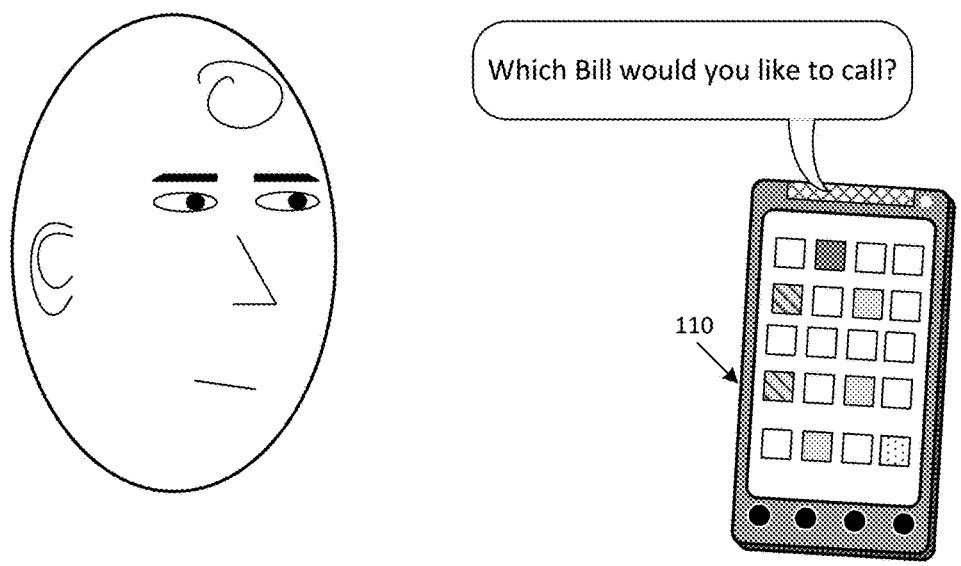

FIGS. 11A-11E illustrate another example of generating or modifying a cancellation score based on subsequent activity. As shown in FIG. 11A, user 105 may provide the input "Call Bill." As shown in FIG. 11B, user device 110 may prompt user 105 for a clarification to the question by outputting the phrase "Which Bill would you like to call?" User device 110 may enter a state in which user device 110 is conditioned to receive input from user 105, e.g., clarifying input specifying which "Bill" user 105 would like to call.

Figure 11C:
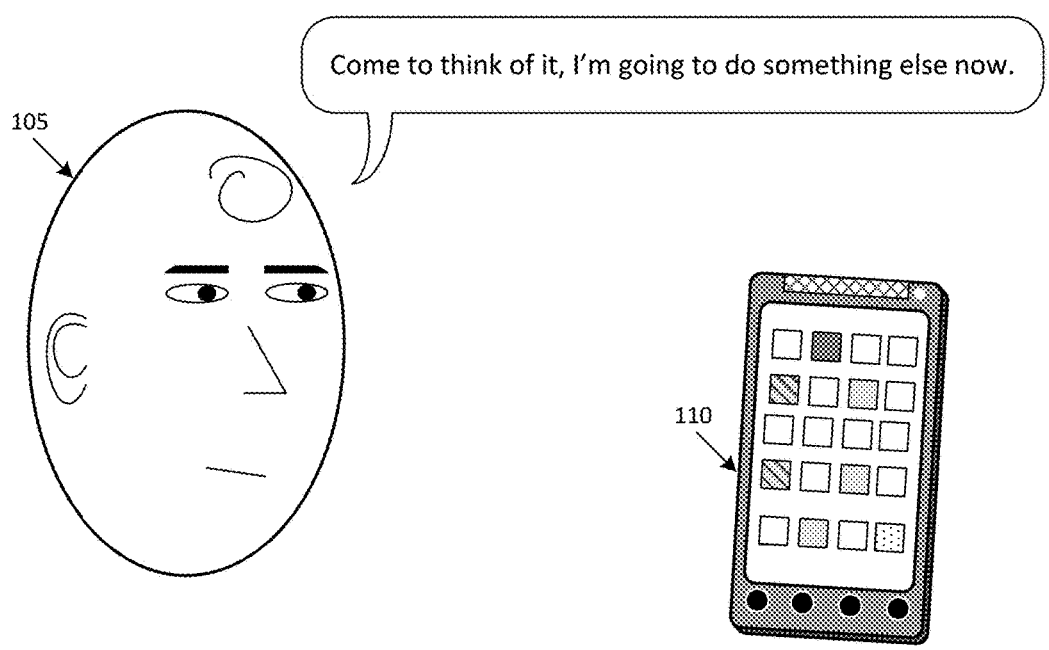

As shown in FIG. 11C, user 105 may provide the input "Come to think of it, I'm going to do something else now" while user device 110 is in the state in which user device 110 is conditioned to receive input from user 105. User device 105 may provide the input to, for example, dialog cancellation detection system 210, which may identify a cancellation score associated with the input that determines whether the input is processed as a cancellation command. Dialog cancellation detection system 210 may provide an indication to user device 110 that the input corresponds to a cancellation command. Based on this indication, user device 110 may exit the state in which user device 110 may receive additional input from user 105.

Figure 11D:
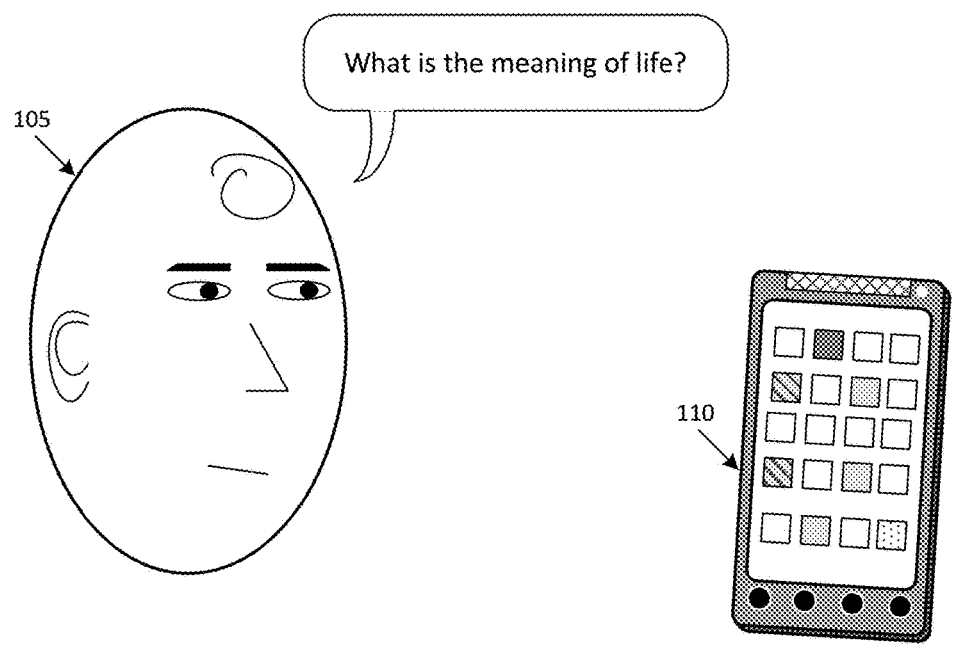
Figure 11E:
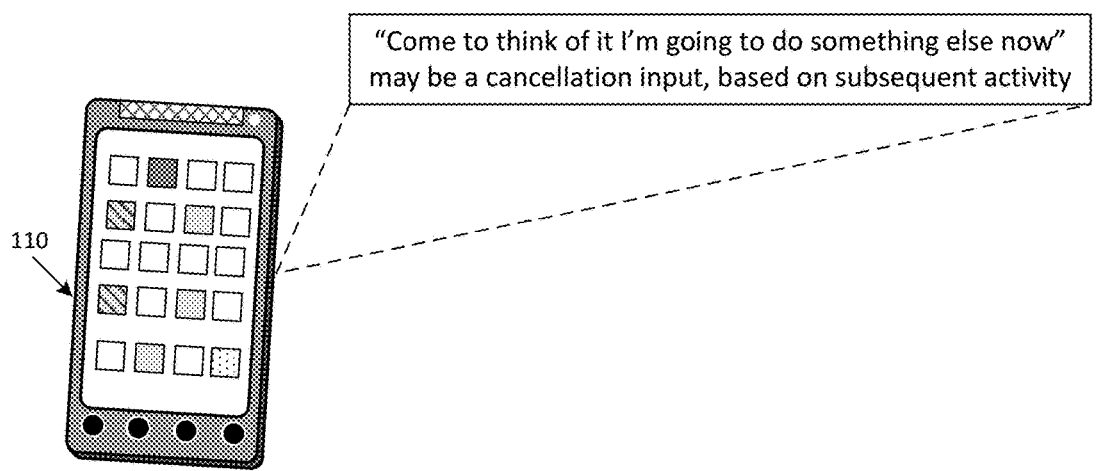

As shown in FIG. 11D, user 105 may perform subsequent activity after user device 110 processes the input as a cancellation command, such as asking the question "What is the meaning of life?" User device 110 may provide information regarding this subsequent activity to dialog cancellation detection system 210. As shown in FIG. 11E, dialog cancellation detection system 210 may identify that this subsequent input is unrelated to the previous input, i.e., "Call Bill." Based on identifying that the subsequent activity is unrelated to the previous input, dialog cancellation detection system 210 may generate, reassign, or modify, e.g., increase or decrease, a cancellation score associated with a potential cancellation term that corresponds to the phrase "Come to think of it, I'm going to do something else now."

Some implementations, described herein, may allow one or more devices to engage in ongoing dialog with users. As part of the dialog, the one or more devices may enter into a state in which input from the user may be received by the system. The one or more devices of some implementations may associate cancellation scores to user inputs identifying that the inputs should be processed as cancellation commands from users. For example, the one or more devices of some implementations may identify inputs from users and assign the inputs cancellation scores that cause the one or more devices to exit the state in which the one or more devices may receive inputs from the users.

In some implementations, the one or more devices may learn, over time, commands that are to be processed as cancellation commands. The one or more devices may, for example, identify commands that are received from users and identify, based on subsequent activity received from the users, that these identified commands should be assigned cancellation scores such that they are processed as cancellation commands. By identifying and properly processing cancellation inputs, the one or more devices may enhance users' experience by, for example, avoiding situations where cancellation commands are not properly identified.

Figure 12A:
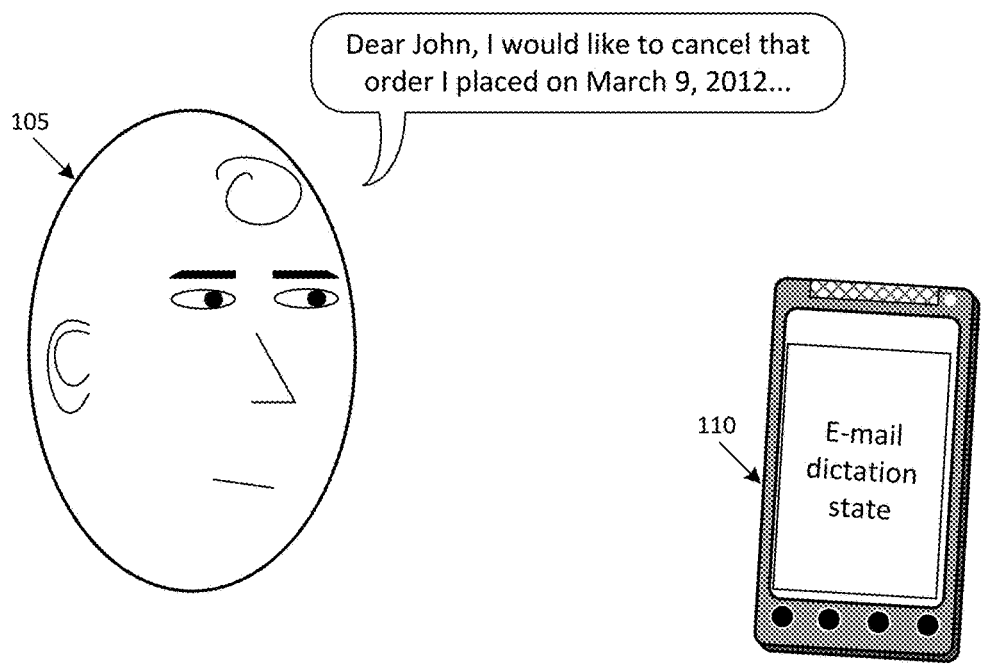
Figure 12B:
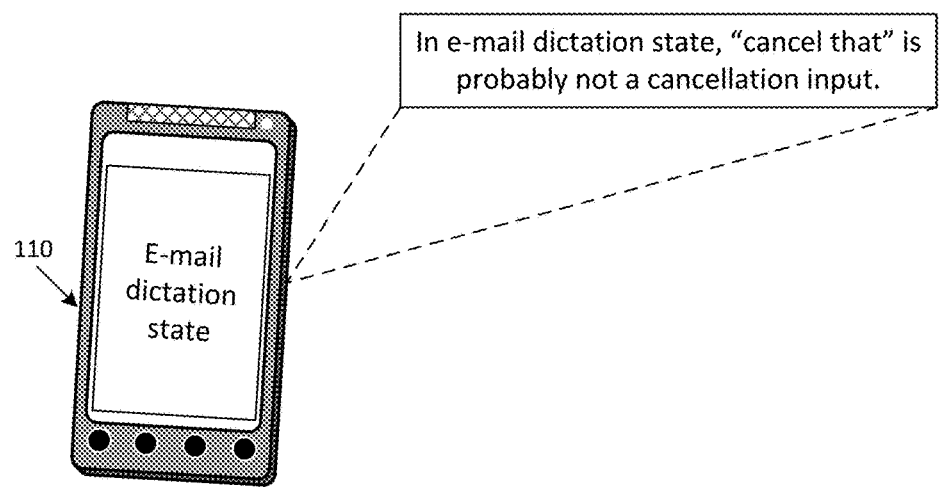

FIGS. 12A-12B illustrate an example of forgoing processing an input as a cancellation command based on a device state. As shown in FIG. 12A, user device 110 may be in an e-mail dictation state. User 105 may audibly provide input which includes the phrase "Dear John, I would like to cancel that order I placed on Mar. 9, 2012." User device 205 may provide this input to dialog cancellation detection system 210, which may identify that, since user device 110 is in an e-mail dictation state, the input, which includes the phrase "cancel that," should not be processed as a cancellation command. As shown in FIG. 12B, user device 110 may forgo processing "cancel that" as a cancellation command, based on user device 110 being in an e-mail dictation state.

Figure 13A:
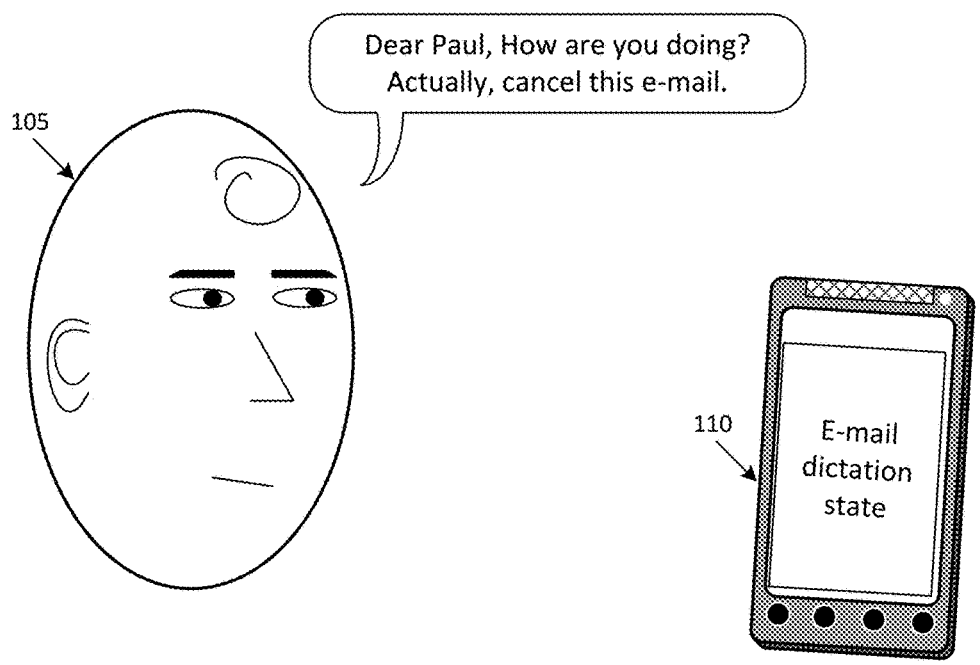
Figure 13B:
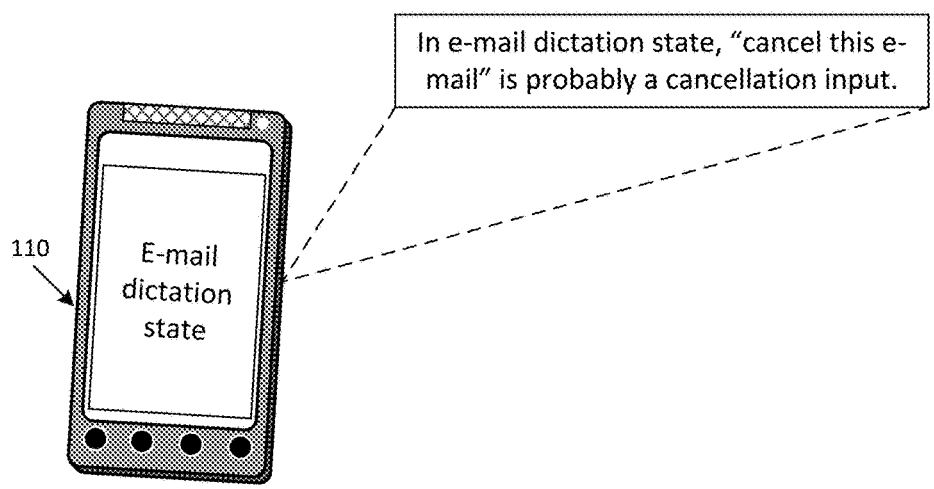

FIGS. 13A-13B illustrate an example of processing an input, that corresponds to a potential cancellation term that is associated with a device state, as a cancellation command based on the device state. As shown in FIG. 13A, user device 110 may be in an e-mail dictation state. User 105 may audibly provide input which includes the phrase "Dear Paul, How are you doing? Actually, cancel this e-mail." User device 205 may provide this input to dialog cancellation detection system 210, which may identify that, since user device 110 is in an e-mail dictation state, the input, which includes the phrase "cancel this e-mail," should be assigned a cancellation score that results in the input being processed as a cancellation command. As shown in FIG. 13B, user device 110 may process "cancel this e-mail" as a cancellation command, based on user device 110 being in an e-mail dictation state.

The preceding description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 8, 9A, and 9B, the order of the blocks may be modified in other implementations. Further, non-dependent blocks may be performed in parallel. Further, in some implementations, processes 800, 900, and/or 950 may include fewer, additional, or different blocks.

Additionally, while some examples of scores and re described above, other examples are possible in addition to, or in lieu of, the scores and/or thresholds described above. For example, while in some implementations, process 900 and 950 may include determining whether a cancellation score is greater than a first threshold score (e.g., at blocks 915 and 970, respectively) and determining whether a cancellation score is less than a second threshold (e.g., at block 980), other implementations may include determining whether a cancellation score is less than a first threshold score (e.g., at block 970) and determining whether a cancellation score is greater than a second threshold (e.g., at block 980).

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method, comprising:
receiving, by a dialog engine, a response to a prompt regarding a request to clarify an initial request;
determining, based at least on a cancellation score that is pre-associated with the response satisfying a first threshold, that the response represents a potential user cancellation of the initial request;
determining that the user has taken an action after the prompt was output that is inconsistent with completion of the initial request;
in response to determining that the response represents a potential user cancellation of the initial request and determining that the user has taken an action after the prompt was output that is inconsistent with completion of the initial request, determining, by the dialog engine, an amount by which to adjust the cancellation score that is pre-associated with the response based on the action the user has taken that is inconsistent with completion of the initial request, wherein the amount by which to adjust the cancellation score that is pre-associated with the response is selected from among multiple values each associated with a different action; and
adjusting the cancellation score that is pre-associated with the response by the amount selected based on the action taken by the user after the prompt was output that is inconsistent with completion of the initial request.

2. The method of claim 1, comprising:
receiving a subsequent request from the user; and
determining that a subsequently received response that matches the response is an indication of cancellation of the subsequent request based on the adjusted cancellation score associated with the response satisfying a second threshold.

3. The method of claim 1, comprising receiving speech data encoding a request spoken by the user.

4. The method of claim 1, comprising:
outputting a prompt that requests the user to confirm that the initial request is to be cancelled, and
determining that the user has taken an action comprises determining that the user has confirmed that the initial request is to be cancelled.

5. The method of claim 1, comprising:
outputting a notification indicating that an action will be automatically initiated unless the user provides an additional input; and
determining that the user has taken an action comprises determining that that the user has provided the additional input.

6. The method of claim 1, wherein determining that the user has taken an action comprises determining that the user has input the request again.

7. The method of claim 1, wherein determining that the user has taken an action comprises determining that the user has input a different request.

8. The method of claim 1, wherein determining that the user has taken an action comprises determining powering down, disabling, or locking of a device that includes the dialog engine.

9. The method of claim 1, wherein determining that the user has taken an action comprises determining that the user has opened an application.

10. The method of claim 1, wherein determining that the user has taken an action comprises determining that the user has input a term that also corresponds to a potential cancellation command.

11. A system comprising:
one or more computers and one or more storage devices storing instructions that are operable, when executed by the one or more computers to perform operations comprising:
receiving, by a dialog engine, a response to a prompt regarding a request to clarify an initial request;
determining, based at least on a cancellation score that is pre-associated with the response satisfying a first threshold, that the response represents a potential user cancellation of the initial request;
determining that the user has taken an action after the prompt was output that is inconsistent with completion of the initial request;
in response to determining that the response represents a potential user cancellation of the initial request and determining that the user has taken an action after the prompt was output that is inconsistent with completion of the initial request, determining, by the dialog engine, an amount by which to adjust the cancellation score that is pre-associated with the response based on the action the user has taken that is inconsistent with completion of the initial request, wherein the amount by which to adjust the cancellation score that is pre-associated with the response is selected from among multiple values each associated with a different action; and adjusting the cancellation score that is pre-associated with the response by the amount selected based on the action taken by the user after the prompt was output that is inconsistent with completion of the initial request.

12. The system of claim 11, comprising:

receiving a subsequent request from the user; and determining that a subsequently received response that matches the response is an indication of cancellation of the subsequent request based on the adjusted cancellation score associated with the response satisfying a second threshold.

13. The system of claim 11, comprising receiving speech data encoding a request spoken by the user.

14. The system of claim 11, comprising:

outputting a prompt that requests the user to confirm that the initial request is to be cancelled, and determining that the user has taken an action comprises determining that the user has confirmed that the initial request is to be cancelled.

15. The system of claim 11, comprising:

outputting a notification indicating that an action will be automatically initiated unless the user provides an additional input; and determining that the user has taken an action comprises determining that that the user has provided the additional input.

16. The system of claim 11, wherein determining that the user has taken an action comprises determining that the user has input the request again.

17. The system of claim 11, wherein determining that the user has taken an action comprises determining that the user has input a different request.

18. The system of claim 11, wherein determining that the user has taken an action comprises determining powering down, disabling, or locking of a device that includes the dialog engine.

19. The system of claim 11, wherein determining that the user has taken an action comprises determining that the user has opened an application.

20. A non-transitory computer-readable medium storing software comprising instructions executable by one or more computers which, upon such execution, cause the one or more computers to perform operations comprising:

receiving, by a dialog engine, a response to a prompt regarding a request to clarify an initial request;

determining, based at least on a cancellation score that is pre-associated with the response satisfying a first threshold, that the response represents a potential user cancellation of the initial request;

determining that the user has taken an action after the prompt was output that is inconsistent with completion of the initial request;

in response to determining that the response represents a potential user cancellation of the initial request and determining that the user has taken an action after the prompt was output that is inconsistent with completion of the initial request, determining, by the dialog engine, an amount by which to adjust the cancellation score that is pre-associated with the response based on the action the user has taken that is inconsistent with completion of the initial request, wherein the amount by which to adjust the cancellation score that is pre-associated with the response is selected from among multiple values each associated with a different action; and adjusting the cancellation score that is pre-associated with the response by the amount selected based on the action taken by the user after the prompt was output that is inconsistent with completion of the initial request.

* * * * *